US011354405B1

(12) United States Patent
Borsa

(10) Patent No.: US 11,354,405 B1
(45) Date of Patent: Jun. 7, 2022

(54) CODE SNIPPET MOBILIZATION SYSTEMS AND METHODS

(71) Applicant: Polyverse Corporation, Bellevue, WA (US)

(72) Inventor: Mariusz G. Borsa, Redmond, WA (US)

(73) Assignee: Polyverse Corporation, Bellevue, WA (US)

( * ) Notice: Subject to any disclaimer, the term of this patent is extended or adjusted under 35 U.S.C. 154(b) by 0 days.

(21) Appl. No.: 17/367,628

(22) Filed: Jul. 6, 2021

(51) Int. Cl.
*G06F 21/54* (2013.01)
*G06F 8/41* (2018.01)
*G06F 9/48* (2006.01)
*G06F 8/656* (2018.01)
*G06F 21/12* (2013.01)

(52) U.S. Cl.
CPC .............. *G06F 21/54* (2013.01); *G06F 8/427* (2013.01); *G06F 8/656* (2018.02); *G06F 9/485* (2013.01); *G06F 21/125* (2013.01)

(58) Field of Classification Search
CPC ........ G06F 21/12; G06F 21/125; G06F 21/54; G06F 21/50; G06F 21/57–577; G06F 8/60–71; G06F 9/445; G06F 8/427; G06F 9/485
USPC ..................................................... 726/22, 25
See application file for complete search history.

(56) References Cited

U.S. PATENT DOCUMENTS

| | | | |
|---|---|---|---|
| 6,658,551 B1 * | 12/2003 | Berenbaum | G06F 9/3885 712/24 |
| 8,014,308 B2 | 9/2011 | Gates, III et al. | |
| 8,312,273 B2 | 11/2012 | Nice et al. | |
| 8,595,743 B2 | 11/2013 | Gounares et al. | |
| 8,650,538 B2 | 2/2014 | Gounares | |
| 8,656,135 B2 | 2/2014 | Gounares et al. | |
| 8,656,378 B2 | 2/2014 | Gounares et al. | |
| 8,694,574 B2 | 4/2014 | Gounares et al. | |
| 8,775,437 B2 | 7/2014 | Weitz et al. | |
| 8,849,968 B2 | 9/2014 | Hunt et al. | |
| 8,909,546 B2 | 12/2014 | Horvitz et al. | |
| 8,966,462 B2 | 2/2015 | Gounares et al. | |
| 8,978,016 B2 | 3/2015 | Gataullin et al. | |
| 9,021,445 B2 | 4/2015 | Gataullin et al. | |
| 9,141,502 B2 | 9/2015 | Havemose | |
| 9,286,042 B2 | 3/2016 | Gounares et al. | |

(Continued)

OTHER PUBLICATIONS

Venkat, Ashish, et al., HIPStR—Heterogeneous-ISA Program State Relocation, Proceedings of the Twenty-First International Conference on Architectural Support for Programming Languages and Operating Systems, Mar. 2016, pp. 727-741, [retrieved on Mar. 28, 2022], Retrieved from the Internet: <URL:http://dl.acm.org/>.*

(Continued)

*Primary Examiner* — Geoffrey R St Leger

(74) *Attorney, Agent, or Firm* — Æon Law; Adam L. K. Philipp; Jonathan E. Olson

(57) ABSTRACT

First and second neighboring bit sequences containing machine language are determined to be (latently) separable. Such determination may be partly based on suitability for separation and partly based on environmental readiness, for example. If separability is determined, any of several response protocols may ensue. For example one or both of the bit sequences may be moved, modified, or trapped as part of a moving target defense.

20 Claims, 16 Drawing Sheets

(56) References Cited

U.S. PATENT DOCUMENTS

| | | | |
|---|---|---|---|
| 9,292,415 | B2 | 3/2016 | Seto et al. |
| 9,389,992 | B2 | 7/2016 | Gataullin et al. |
| 9,417,859 | B2 | 8/2016 | Gounares et al. |
| 9,465,721 | B2 | 10/2016 | Garrett et al. |
| 9,483,590 | B2 | 11/2016 | Kishore et al. |
| 9,558,362 | B2 | 1/2017 | Bedoya |
| 9,665,474 | B2 | 5/2017 | Li et al. |
| 9,807,077 | B2 | 10/2017 | Gounares |
| 9,923,793 | B1 | 3/2018 | Gore et al. |
| 10,033,604 | B2 | 7/2018 | Maes et al. |
| 10,050,797 | B2 | 8/2018 | Garrett et al. |
| 10,127,160 | B2 | 11/2018 | Gounares et al. |
| 10,142,453 | B2 | 11/2018 | Shuttleworth et al. |
| 10,339,837 | B1 | 7/2019 | Gounares et al. |
| 10,354,080 | B2 | 7/2019 | Clough et al. |
| 10,356,155 | B2 | 7/2019 | Tiwari et al. |
| 10,360,150 | B2 | 7/2019 | Karthikesan |
| 10,382,424 | B2 | 8/2019 | Kroehling et al. |
| 10,416,979 | B2 | 9/2019 | Scrivano et al. |
| 10,554,685 | B1 | 2/2020 | McArdle et al. |
| 10,701,213 | B2 | 6/2020 | Dyer et al. |
| 10,733,303 | B1 | 8/2020 | Gore et al. |
| 10,747,510 | B1 * | 8/2020 | Lundeen ............... G06F 8/71 |
| 2007/0256064 | A1 * | 11/2007 | Torrubia ............ G06F 21/125 717/151 |
| 2014/0208428 | A1 * | 7/2014 | Guarnieri ........... G06F 21/577 726/25 |
| 2014/0274078 | A1 | 9/2014 | Hyde et al. |
| 2015/0094046 | A1 | 4/2015 | Jung et al. |
| 2015/0106872 | A1 * | 4/2015 | Hiser .................. H04L 63/20 726/1 |
| 2016/0147511 | A1 * | 5/2016 | Eble ..................... G06F 8/41 717/144 |
| 2016/0191547 | A1 | 6/2016 | Zafar et al. |
| 2017/0147811 | A1 | 5/2017 | Angelsmark et al. |
| 2018/0373506 | A1 * | 12/2018 | Cook .................. G06F 8/427 |
| 2020/0042695 | A1 * | 2/2020 | Kanei .................. G06F 21/51 |

OTHER PUBLICATIONS

Volckaert, Stijn, et al., Cloning Your Gadgets: Complete ROP Attack Immunity with Multi-Variant Execution, IEEE Transactions on Dependable and Secure Computing, vol. 13, Issue: 4, Jul.-Aug. 1, 2016, pp. 437-450, [retrieved on Mar. 28, 2022], Retrieved from the Internet: <URL:http://ieeexplore.ieee.org/>.*

* cited by examiner

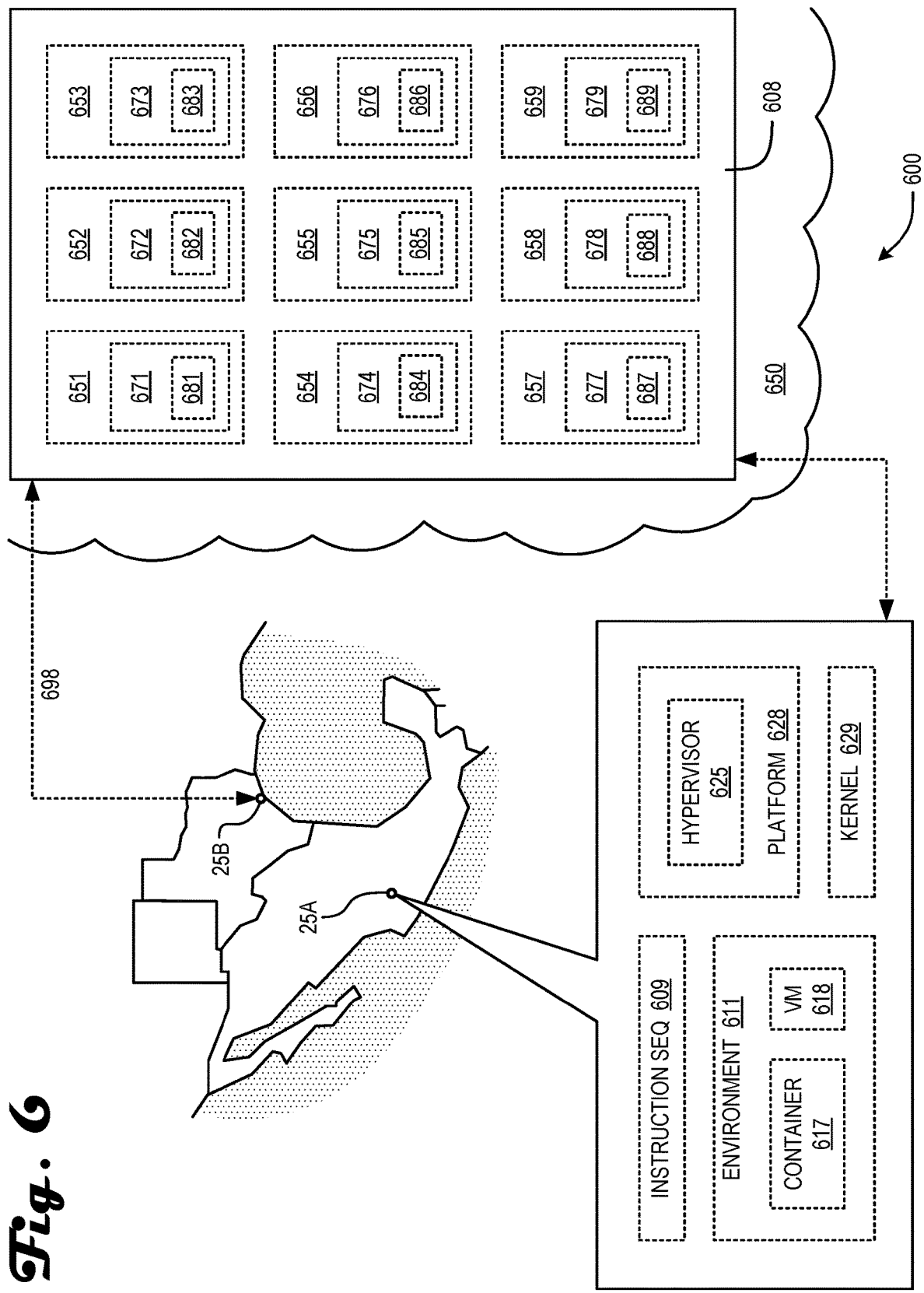

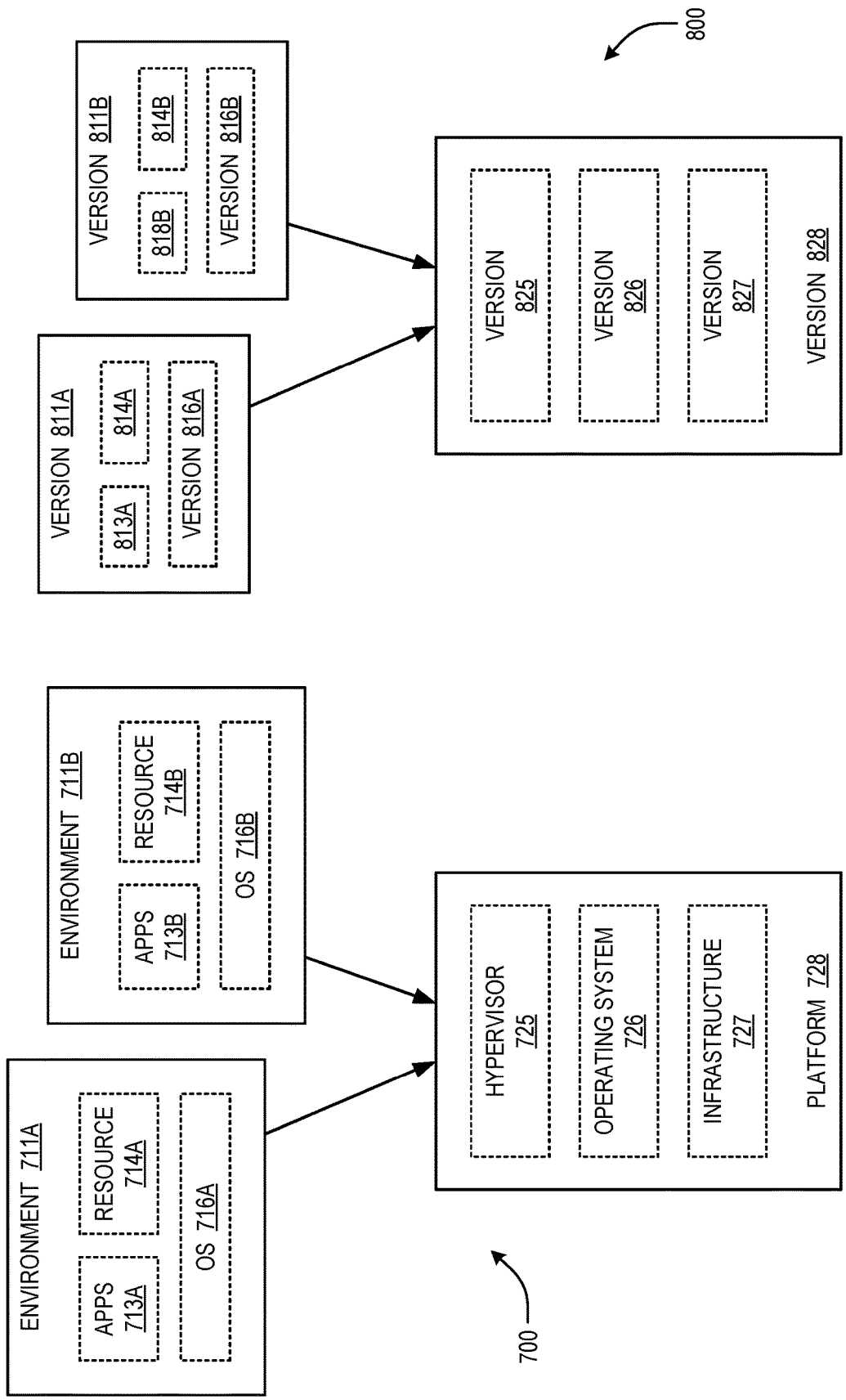

CODE SNIPPET MOBILIZATION SYSTEMS AND METHODS

RELATED APPLICATIONS

None.

BRIEF DESCRIPTION OF THE DRAWINGS

FIG. 6 depicts a system implementing virtualization or migration (or both) in which one or more security enhancements may be implemented on one or both sides of an international border.

FIG. 7 depicts a system in which additional aspects of virtualization are described and in which one or more improved technologies may be incorporated.

FIG. 8 depicts another system in which additional aspects of virtualization are described and in which one or more improved technologies may be incorporated.

DETAILED DESCRIPTION

Figure 1:
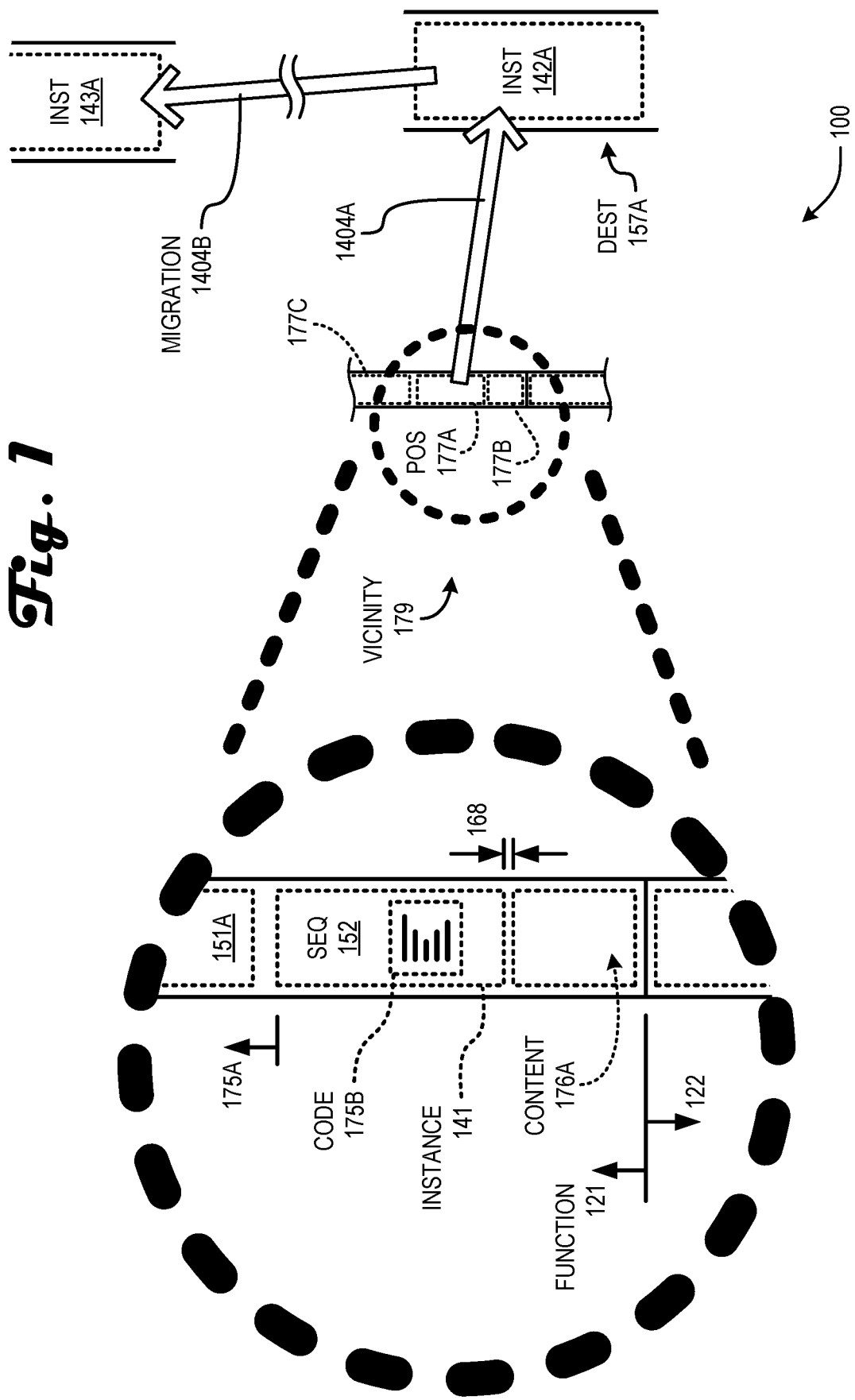
FIG. 1 depicts a media-resident content layout including a selective migration of a machine code snippet in which one or more improved technologies may be incorporated.

The detailed description that follows is represented largely in terms of processes and symbolic representations of operations by conventional computer components, including a processor, memory storage devices for the processor, connected display devices, and input devices. Furthermore, some of these processes and operations may utilize conventional computer components in a heterogeneous distributed computing environment, including remote file servers, computer servers, and memory storage devices.

It is intended that the terminology used in the description presented below be interpreted in its broadest reasonable manner, even though it is being used in conjunction with a detailed description of certain example embodiments. Although certain terms may be emphasized below, any terminology intended to be interpreted in any restricted manner will be overtly and specifically defined as such.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. "Actual," "adjacent," "after," "aliased," "alphanumeric," "application-specific," "apparent," "associated," "automatic," "based," "between," "binary," "caused," "compiled," "component," "comprising," "computing," "conditional," "configured," "conjoining," "corresponding," "currently," "defined," "detected," "determined," "enabled," "established," "executable," "expressed," "first," "identified," "implemented," "in," "indicative," "invoked," "jointly," "latent," "manifested," "monitored," "near," "new," "next," "obtained," "operational," "other," "particular," "performed," "polymorphed," "probabilistic," "protected," "public," "recent," "remote," "responsive," "safer," "second," "signaled," "so as," "spawned," "special-purpose," "subsequent," "suitable," "supported," "symptomatic," "then," "third," "translated," "triggered," "virtualized," "wherein," "without," or other such descriptors herein are used in their normal yes-or-no sense, not merely as terms of degree, unless context dictates otherwise. In light of the present disclosure, those skilled in the art will understand from context what is meant by "remote" and by other such positional descriptors used herein. Likewise they will understand that "aliasing" refers herein to a class of security protocols that includes polymorphic compilation and similar randomization but not mere virtualization, filtering, or error response protocols. Likewise they will understand what is meant by "partly based" or other such descriptions of dependent computational variables/signals. "Numerous" as used herein refers to more than one dozen. "Instantaneous" as used herein refers to having a duration of less than 0.1 seconds unless context dictates otherwise. "Immediate" as used herein refers to having a duration of less than 7 seconds unless context dictates otherwise. Circuitry or data items are "onboard" as used herein if they are aboard a vehicle or denoting or controlled from a facility or feature incorporated into the main circuit board of a computer or computerized device unless context dictates otherwise. Circuitry is "invoked" as used herein if it is called on to undergo voltage state transitions so that digital signals are transmitted therefrom or therethrough unless context dictates otherwise. Software is "invoked" as used herein if it is executed/triggered unless context dictates otherwise. One number is "on the order" of another if they differ by less than an order of magnitude (i.e., by less than a factor of ten) unless context dictates otherwise. As used herein "causing" is not limited to a proximate cause but also enabling, conjoining, or other actual causes of an event or phenomenon.

Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures.

As used herein an "instance" of a thing may include a perfect copy. A copied "instance" of a digital object, for example, may become a new version by being modified or created so as to differ in composition from the prior version. Not every new instance qualifies as a new "version," but every first and second versions of a digital object differ in composition. As used herein a "version" of a digital object refers to a variant having partial structural identically with the object or partial functional identically with the object (or both). For example, two "versions" of semicolons may exist in respective programming languages if at least one rule applicable to one does not apply to the other. As used herein a modification of a digital item is "facilitated" by triggering, enabling, defining, signaling, or causing the modification (or a combination of these).

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 depicts a media-resident content layout 100 including a serial vicinity 179 of positions 177A-B that includes a target function 121 and one or more neighboring structures (e.g. function 122). In a pre-migration state an instance 141 of bit sequence 152 (shown with a higher magnification) occupies position 177A (shown with a lower magnification). After migration 1404A, a second instance 142A of bit sequence 152 occupies a destination 157A further from one or more positions 177B-C that neighbor the position 177A. This migration 1404A selectively moves machine code 175B as depicted, without maintaining neighboring machine code 175A with which it has previously been associated. It severs snippets of machine code 175A-B that were previously associated at least by virtue of having been in a single common function 121 that was compiled from a single source code file (not shown). Such severing and selective migrations 1404 will often be feasible without recompilation in light of teachings herein, even where respective bits sequences 151A, 152 containing such code were previously interlinked. Neighboring content 176A need not be moved, or it may migrate elsewhere or later. Certain opportunities may exist in maintaining correct interconnections between code 175 in some contexts, such as when offsets 168 between code 175B to be moved and neighboring content 176A are large enough to allow for persistent metadata taking the form of programmatic appended annotations. Such annotations may yield efficient implementations, but it will be understood that such consistent structure may create a security tradeoff that one-time metadata would not.

As shown a first instance 141 of a bit sequence 152 is copied or otherwise migrated from its a priori position 177A to become a second instance 142A at a first destination 157A. Correct interlinkage and processing is maintained through this process by various technologies exemplified herein so that entry points to and from machine code 175B are suitably updated or otherwise maintained. See FIG. 2. Moreover one or more instances of additional such migrations 1404B allow (at least an essential majority of) the second bit sequence 152 that was at position 177A to migrate again and again to become a serial plurality of additional instances 142A, 143A. Such migrations 1404A-B, pervasively implemented in a computing environment, can create a formidable moving target defense against Return-Oriented-Programming (ROP) without a significant sacrifice in performance. It is expected that an aggregate efficiency loss L<0.1% may be maintained with an average anticipated frequency of snippet migration on the order of once a week. For a higher level of security, however—e.g. in response to an apparent attack—it is expected that an average anticipated frequency of snippet migration on the order of hourly or daily could be achieved still with an efficiency loss L<2%.

Figure 2:
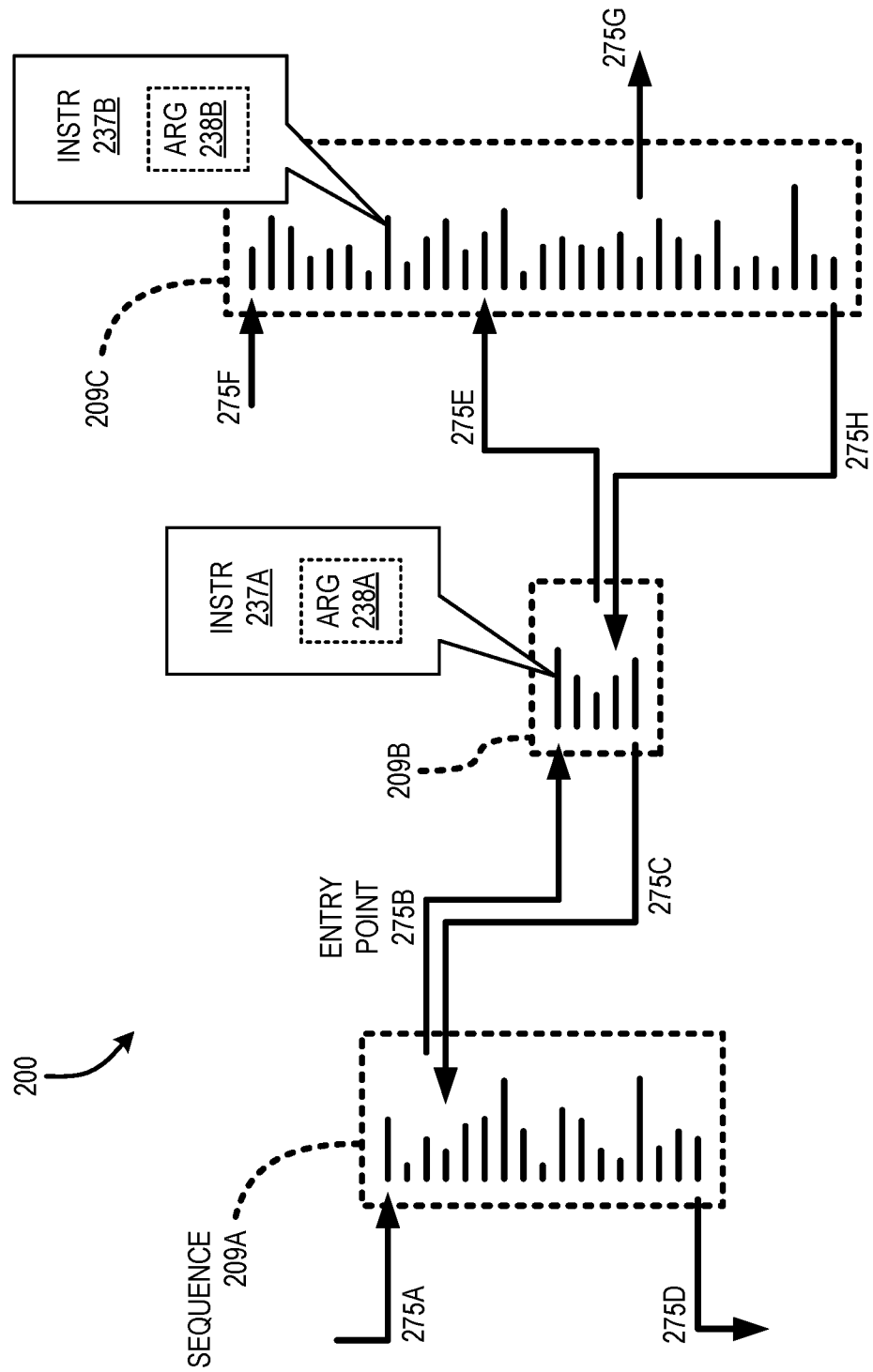
FIG. 2 depicts another media-resident content layout featuring entry points between instruction sequences in which one or more improved technologies may be incorporated.

FIG. 2 depicts another media-resident content layout featuring entry points between instruction sequences 209A-C in which one or more improved technologies may be incorporated with regard to instructions 237A-B, their arguments 238A-B, or substitute structures. For example a call, return, or jump instruction 237 allows for transitions among instruction sequences 209A-C. An entry point 275B from an intermediate part of sequence 209A into an upstream/top part of sequence 209B is shown, which soon transitions (via entry point 275E) to sequence 209C and sometime later (conditionally) back to sequence 209B and 209A. All such linkages may effectively be maintained to preserve (relational) code correctness notwithstanding a movement of sequence 209B. For example such maintenance may include modifying a relative value address (RVA) within an argument 238, substituting one or more instructions 237 of a sequence 209, modifying an address in a stack, or installing a trampoline or other interstitial structure. See FIGS. 3-5.

Figure 3:
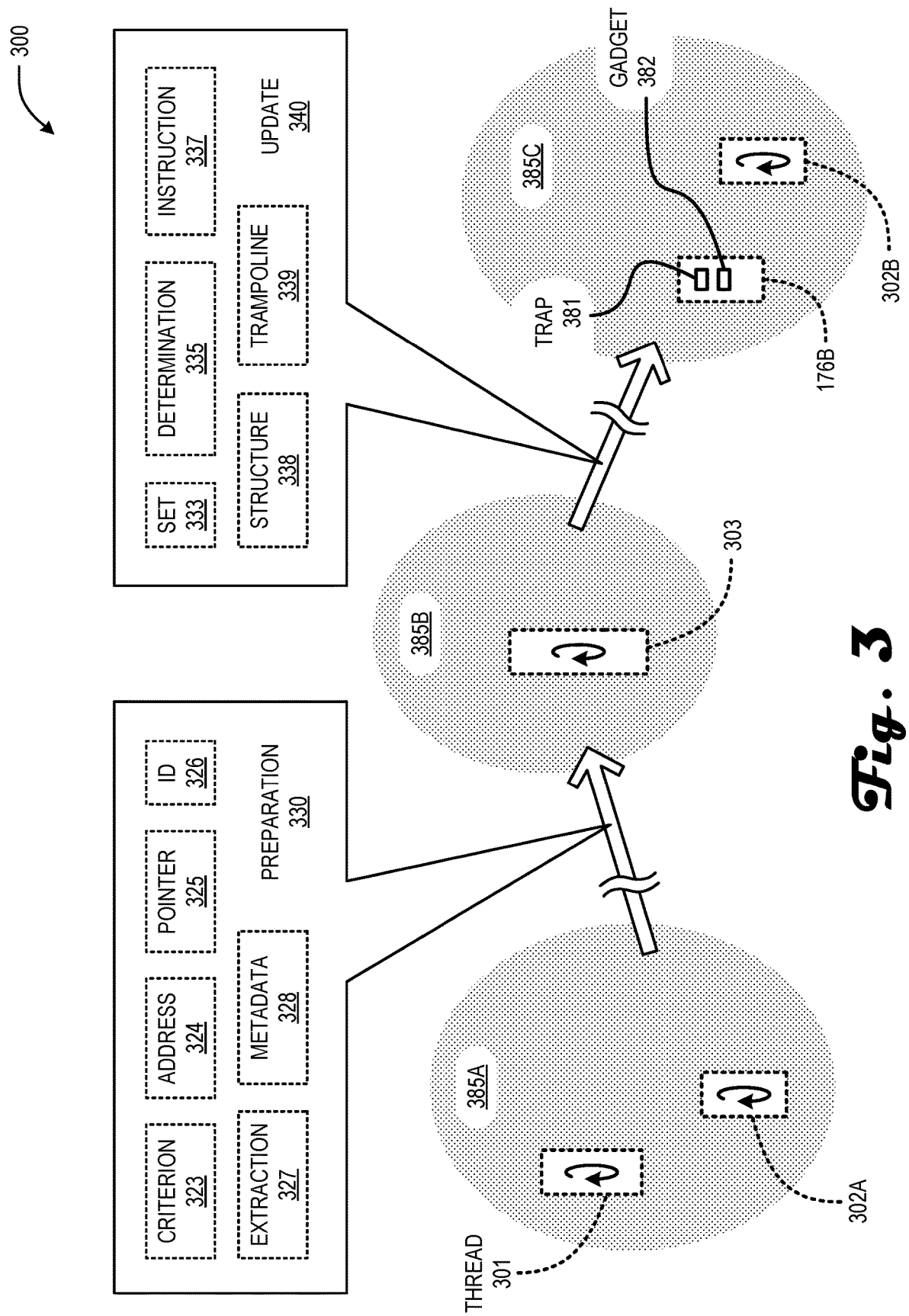
FIG. 3 depicts another media-resident content layout featuring environmental state changes in which one or more improved technologies may be incorporated.

FIG. 3 depicts another media-resident content layout featuring an original or early state 385A of a computing environment in which one or more threads 301, 302A are operating. Following one or more pauses or other preparations 330, the environment reaches one or more interstitial states 385B in which one or more threads 303 implement one or more diagnostic distillation protocols as described herein. Such protocols may relate to one or more instances of criteria 323, of addresses 324, of pointers 325, of identifiers 326, of extractions 327, or of metadata 328 or combinations thereof.

Interstitially or otherwise one or more iterations of therapeutic protocols may implement one or more updates 340 based on such preparation so as to place the subject environment in a protected state 385C. Such protocols may relate to one or more instances of sets 333, of determinations 335, of instructions 337, of digital structures 338 (e.g. stacks, tables, or trampolines 339), of persistent content 176A (i.e. lasting more than 24 hours), or combinations thereof. Such 176 may include metadata 328 annotating a bit sequence, trampoline, or other such structure to which it relates, for example, or may include one or more traps 381 that track, impair, or otherwise effectively hijack gadgets 382 that would otherwise have been part of an effective attack chain. And in some instances one or more threads 302B that were paused and updated may thereafter safely resume execution in a safer environmental state 302B as shown.

Figure 4:
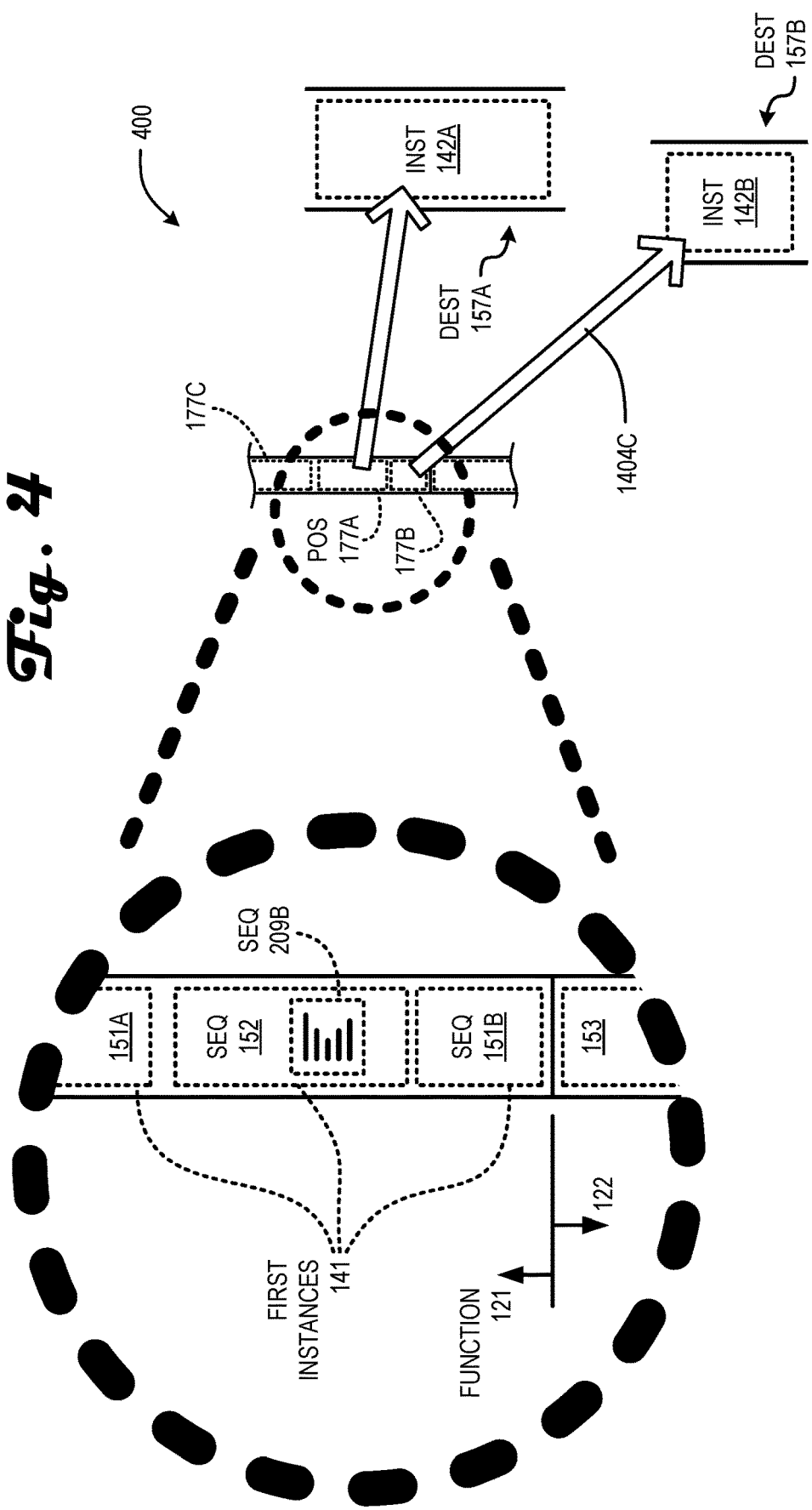
FIG. 4 depicts another media-resident content layout including additional migration of bit sequences in which one or more improved technologies may be incorporated.

FIG. 4 depicts a media-resident content layout 400 slightly different from that of FIG. 1. First instances 141 of several bit sequences 151-153 that were previously all in a common vicinity 179 are all effectively severed from one another without a loss of code correctness. Entry points 275 therebetween have undergone processing (e.g. by one or more instances of threads 303 performing interstitial protocols) pursuant to one or more preparations 330 and one or more updates 340. As a result suitable linkages are maintained notwithstanding migrations 1404A, 1404C (of at least an essential majority of each instance) of sequence 152 to become a second instance 142A thereof at destination 157A and of a once-downstream neighboring sequence 151B to become a second instance 142B thereof at destination 157B. Likewise suitable migrations 1404 and updated linkages may preserve connections of a machine code instruction sequence 209B (as shown in FIG. 2) without recompiling whether or not a first instance 141 of a once-upstream neighboring bit sequence 151A remains at its position 177C as shown.

Figure 5:
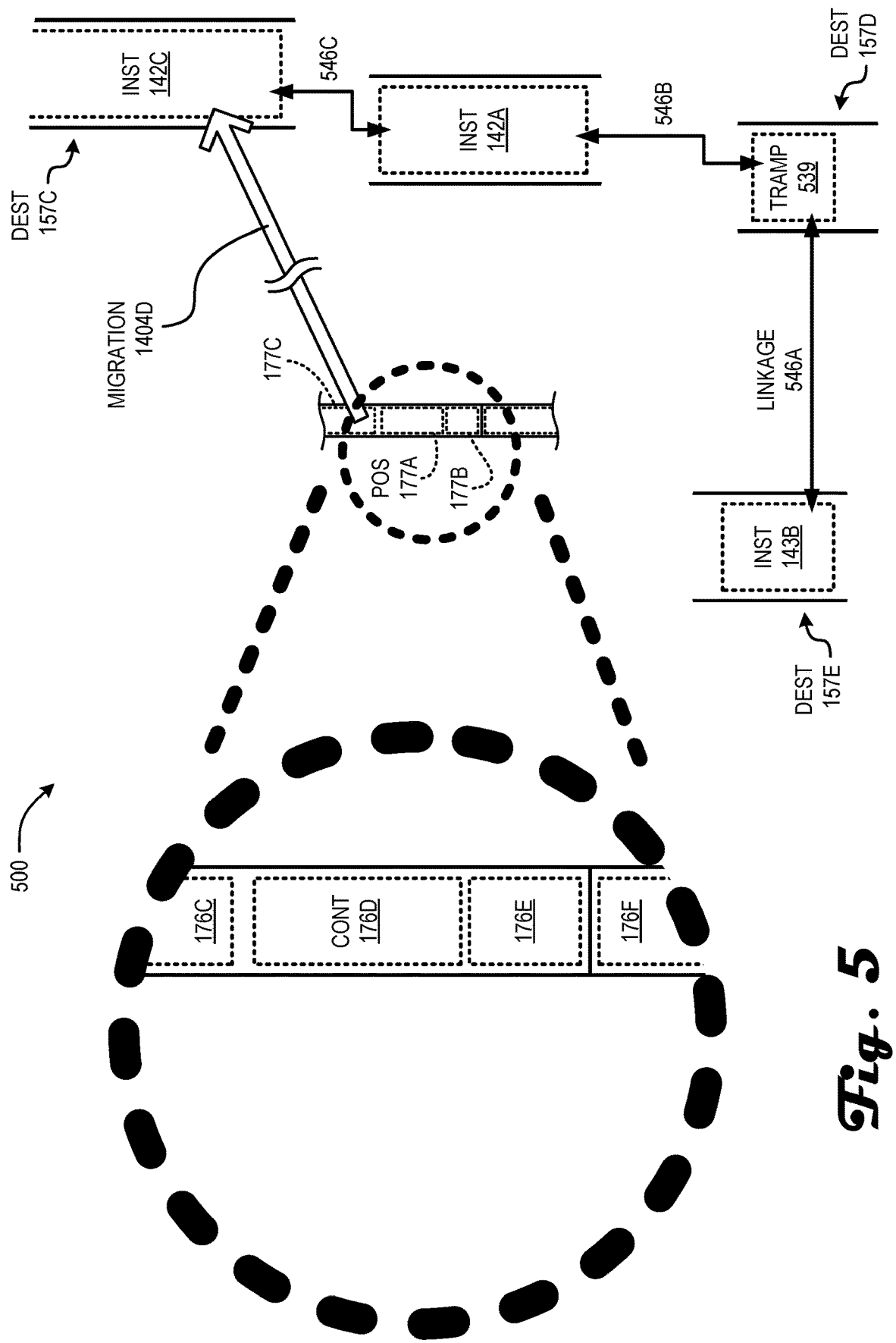
FIG. 5 depicts yet another media-resident content layout including other migration of bit sequences in which one or more improved technologies may be incorporated.

FIG. 5 depicts a media-resident content layout 500 somewhat different from that of FIG. 1 or FIG. 4. First instances 141 of several bit sequences 151-153 have been replaced in their respective positions 177 and (their prior positions) erased or otherwise repurposed. Suitable linkages 546A-C therebetween are (selectively updated or otherwise modified and thereby) maintained notwithstanding one or more additional migrations 1404D. A second instance 142C of (an entirety or essential majority of) a once-upstream bit sequence 151A now inhabits a destination 157C that is linked to an instance 142A of bit sequence 152 and indirectly thereby to an instance 143B of a once-downstream bit sequence 151B that has been transplanted to destination 157E. Connection is maintained in this configuration via a portable trampoline 539 currently residing at destination 157D, as further described below. As used herein an "essential majority" of a bit sequence is migrated if a resulting instance thereof arrives at its destination with most of the opcodes or other instructions 237 thereof intact, whether or not code correctness yet exists in linkages 546 or threads 301, 302 at that destination.

FIG. 6 schematically illustrates salient aspects of one or more distributed or other data-handling systems 600 configured to facilitate international monitoring and comprising transistor-based circuitry 608 in one or more data networks 650, in which one or more technologies may be implemented. In various embodiments any of the above-depicted content may be implemented in a support interface 25A-B, server, server, or other module or distributed among these. Cyberattacks come in many forms and in some contexts it is helpful to have a pervasive and agile defense. As shown a client device or other hardware-implemented support interface 25A in Mexico may interact with another hardware-implemented support interface 25B in Texas via one or more communication channels 698 therebetween. In the interest of concision and according to standard usage in information management technologies, the functional attributes of modules described herein are set forth in natural language expressions. It will be understood by those skilled in the art that such expressions (functions or acts recited in English, e.g.) adequately describe structures identified below so that no undue experimentation will be required for their implementation. For example, any session parameters or other informational data identified herein may easily be represented digitally as a voltage configuration on one or more electrical nodes (conductive pads of an integrated circuit, e.g.) of an event-sequencing structure without any undue experimentation. Each electrical node is highly conductive, having a corresponding nominal voltage level that is spatially uniform generally throughout the node (within a device or local system as described herein, e.g.) at relevant times (at clock transitions, e.g.). Such nodes (lines on an integrated circuit or circuit board, e.g.) may each comprise a forked or other signal path adjacent one or more transistors. Moreover, many Boolean values (yes-or-no decisions, e.g.) may each be manifested as either a "low" or "high" voltage, for example, according to a complementary metal-oxide-semiconductor (CMOS), emitter-coupled logic (ECL), or other common semiconductor configuration protocol. In some contexts, for example, one skilled in the art will recognize an "electrical node set" as used herein in reference to one or more electrically conductive nodes upon which a voltage configuration (of one voltage at each node, for example, with each voltage characterized as either high or low) manifests a yes/no decision or other digital data.

Such circuitry 608 may comprise one or more integrated circuits (ICs), for example, optionally mounted on one or more circuit boards. Whether implemented in a distributed cloud or within one or more interfaces 25A-B or other devices described herein, transistor-based circuitry 608 comprises an event-sequencing structure generally as described in U.S. Pat. Pub. No. 2015/0094046 but configured as described herein. Transistor-based circuitry 608 may (optionally) include one or more instances of invocation modules 651 configured to invoke one or more other modules 652-159 configured to perform a function, for example, each including an electrical node set 671 upon which informational data is represented digitally as a corresponding voltage configuration 681. (It deserves emphasis that when a user or other signal originator "invokes" one or more modules 652-159 configured to perform a function, other circuitry along the signal path will also typically "invoke" circuitry downstream configured to perform that function, in a cascading fashion.)

Transistor-based circuitry 608 may likewise include one or more instances of interface modules 652 configured for triggering remote or other processing, each including an electrical node set 672 upon which informational data is represented digitally as a corresponding voltage configuration 682. Transistor-based circuitry 608 may (optionally) likewise include one or more instances of (memory map or other) randomization modules 653 configured for triggering local or other processing, each including an electrical node set 673 upon which informational data is represented digitally as a corresponding voltage configuration 683. Transistor-based circuitry 608 may likewise include one or more instances of (forensic or other processing) suspension modules 654 configured for controlling and otherwise triggering local or other processing, each including an electrical node set 674 upon which informational data is represented digitally as a corresponding voltage configuration 684. Transistor-based circuitry 608 may likewise include one or more instances of (event or other pattern) recognition modules 655 configured for triggering local or other processing, each including an electrical node set 675 upon which informational data is represented digitally as a corresponding voltage configuration 685. Transistor-based circuitry 608 may likewise include one or more instances of extraction modules 656 configured for triggering local or other processing, each including an electrical node set 676 upon which informational data is represented digitally as a corresponding voltage configuration 686. Transistor-based circuitry 608 may likewise include one or more instances of control modules 657 configured for triggering local or other processing, each including an electrical node set 677 upon which informational data is represented digitally as a corresponding voltage configuration 687. Transistor-based circuitry 608 may likewise include one or more instances of response modules 658 configured for triggering local or other processing, each including an electrical node set 678 upon which informational data is represented digitally as a corresponding voltage configuration 688. Transistor-based circuitry 608 may likewise include one or more instances of implementation modules 659 configured for triggering local or other processing, each including an electrical node set 679 upon which informational data is represented digitally as a corresponding voltage configuration 689. In some variants, for example, a server or other support interface 25A-B in one country may manifest one or more instances of instruction sequences 609, of virtualization or other computing environments 611 (e.g. comprising one or more virtual containers 617 or virtual machines), or of hypervisors 625 or other components that support a platform 628 or kernel 629 (or both). However such circuitry 608 is installed or arranged it will be understood that reconfiguring the arrangement for convenient performance or geography is contemplated as described herein according to the scope and spirit of respective inventions described.

FIG. 7 schematically illustrates another system 700 in which one or more technologies may be implemented, for example, one or more of which may be instantiated within or otherwise interact with the system 600 of FIG. 6. A platform 728 of system 700 as shown may include one or more instances of hypervisors 725, of host operating systems 726, or of other components of infrastructure 727. When deployed platform 728 may (optionally) be configured to support two or more virtual environments 711A-B within which one or more apps 713A-B or other resources 714A-B are each supported by one or more corresponding guest operating systems 716A-B as shown. One skilled in the art will understand that in some contexts an instance of system 700 may include one or more additional virtual environments 711 or other features that are not shown.

FIG. 8 schematically illustrates another system 800 in which one or more technologies may be implemented as an adaptation, for example, of the system 700 of FIG. 7. Another version 828 of platform 728 as shown may include one or more versions 825 of hypervisors 725 or other such hosting engines. Alternatively or additionally, version 828 may comprise one or more versions 826 of operating systems 726 or one or more versions 827 of infrastructure 727 (or both) of which some or all may differ from that of FIG. 7. Likewise when deployed platform version 828 may (optionally) be configured to support two or more virtual environment versions 811A-B within which one or more application versions 813A-B or other resource versions 814A-B are each supported by one or more corresponding guest operating system versions 816A-B as shown. Such terminology and depiction can be useful, for example, for describing a relationship between a machine language (expression of a) hypervisor 725 and a corresponding source code version 825. Other such reasons for highlighting a similarity between system 700 and system 800 will become clearer as described below, particularly with regard to descriptions of FIGS. 14-17 and annotated numbered clauses thereafter. In some contexts an instance of system 800 may include one or more other virtual environment versions 811 although they are not shown.

Figure 9:
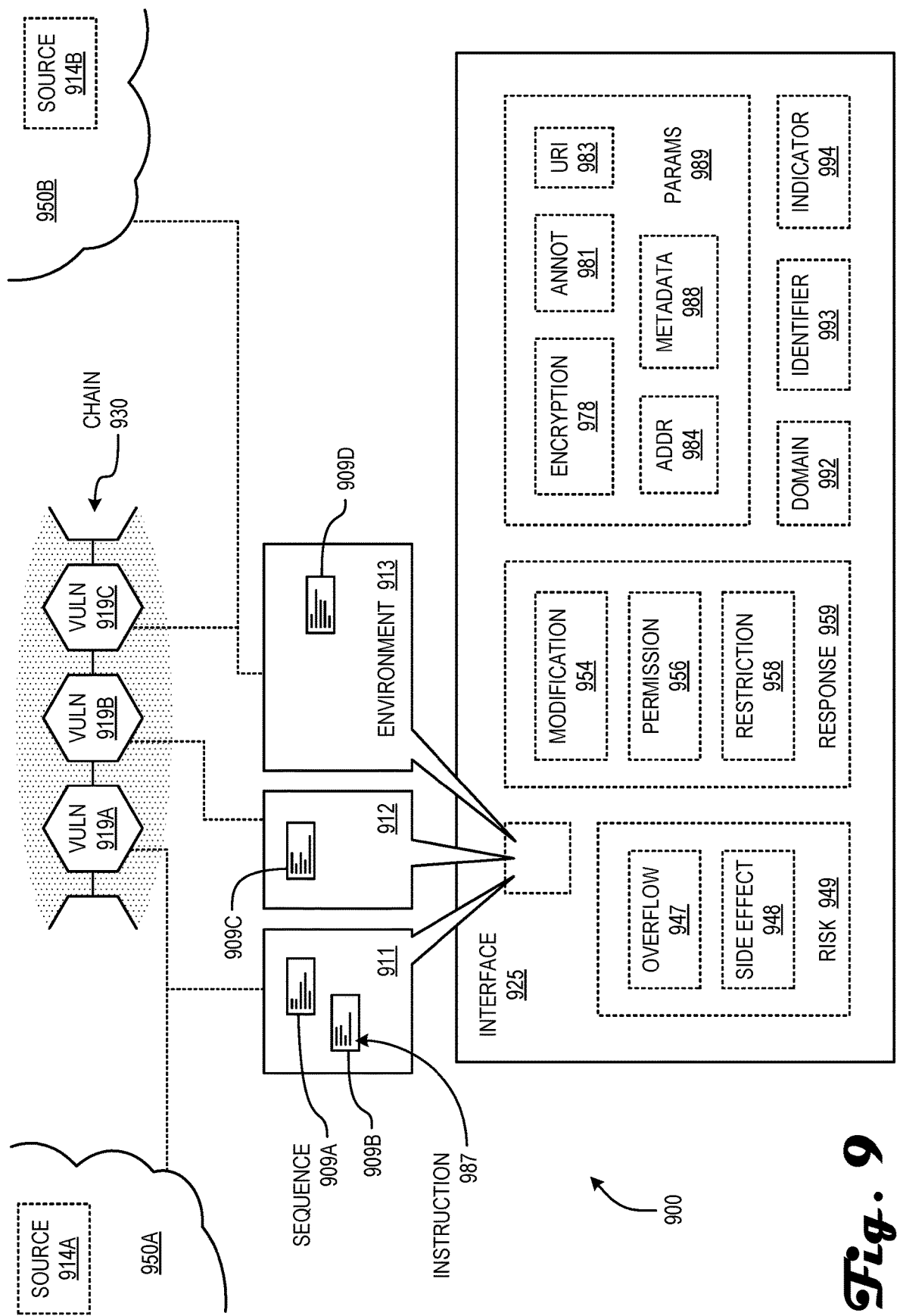
FIG. 9 depicts a system in which additional aspects of virtualization relating to security enhancement may be implemented.

FIG. 9 schematically illustrates a system 900 in which one or more technologies may be implemented, for example, incorporating one or more of the above-described systems 600, 700, 800. A support interface 925 (e.g. a hypervisor 125, 725) is configured to allow instruction sequences 909A-D to be executed in relative safety from conventional attacks by virtue of separations between respective virtual environments 911-913 as shown. But a higher degree of monitoring or other security may be needed to counter or even detect a more insidious attack, for example, devised by an artificial intelligence or other augmented adversary.

As shown a highly regarded source 914A (e.g. a first trusted programmer operating in a first network 950A) is believed to have provided safe and reliable code over the course of years and has also provided one or more instruction sequences 909A-B that manifest an intentional or other subtle vulnerability 919A. Likewise another trusted source 914B in another network 950B is believed to have created or validated one or more other instruction sequences 909D containing an undetected vulnerability 919C, intentionally or otherwise. And it is posited that a coordinated action by one or more adversaries in a multi-stage attack chain 930 may be effective for breaching a system 900 notwithstanding the separations between respective virtual environments 911-913.

Such breaches may manifest as one or more instances of a detectable risk 949 (e.g. an anomaly such as an overflow 947 or unexpected side effect 948). This can occur, for example, in a context in which one or more instances of selective modifications 954, of permissions 956, of restrictions 958, or of other strategic responses 959 to such risks 949 are associated with one or more operating parameters 989, domains 992, identifiers 993, or other indicators 994, as described below. Such parameters 989, for example, may include one or more instances of encryptions 978; of uniform resource identifiers 983; of universal resource locators or other addresses 324, 984; or of other metadata 328, 988 pertaining to an instruction sequence or other function described herein.

In some inventive methods described herein, for example, an operating system 716A is established in a virtual environment 911 and another operating system 716B is established in a virtual environment 912. At least these two are both monitored by a (hypervisor 125 or other) support interface 925 so that a service runs in each of the respective computing environments 911, 912. The first support interface 925 is allowed to pause the service running in the first virtual environment in a particular operational state so that an operating parameter 989 relating to the first computing environment 911 characterizes the particular operational state. See FIG. 15. This can occur, for example, in a context in which a control module 657 comprises a polymorphic compiler that does not allow or contain any execution sequence jump instruction 987 that points outside the build environment 611; in which the build environment 611 is configured to generate the polymorphed version 825 using the polymorphic compiler; in which the paused process is migrated to a new virtual environment monitored by a polymorphed version 825 of the support interface 925 in response to a risk-indicative signal; in which the polymorphed version 825 of the support interface 925 effectively severs the attack chain 930; and in which a risk 949 of undetected vulnerabilities 919A-C in an attack chain 930 would otherwise require a support interface user to fork the code base and absorb all subsequent source code maintenance costs.

Figure 10:
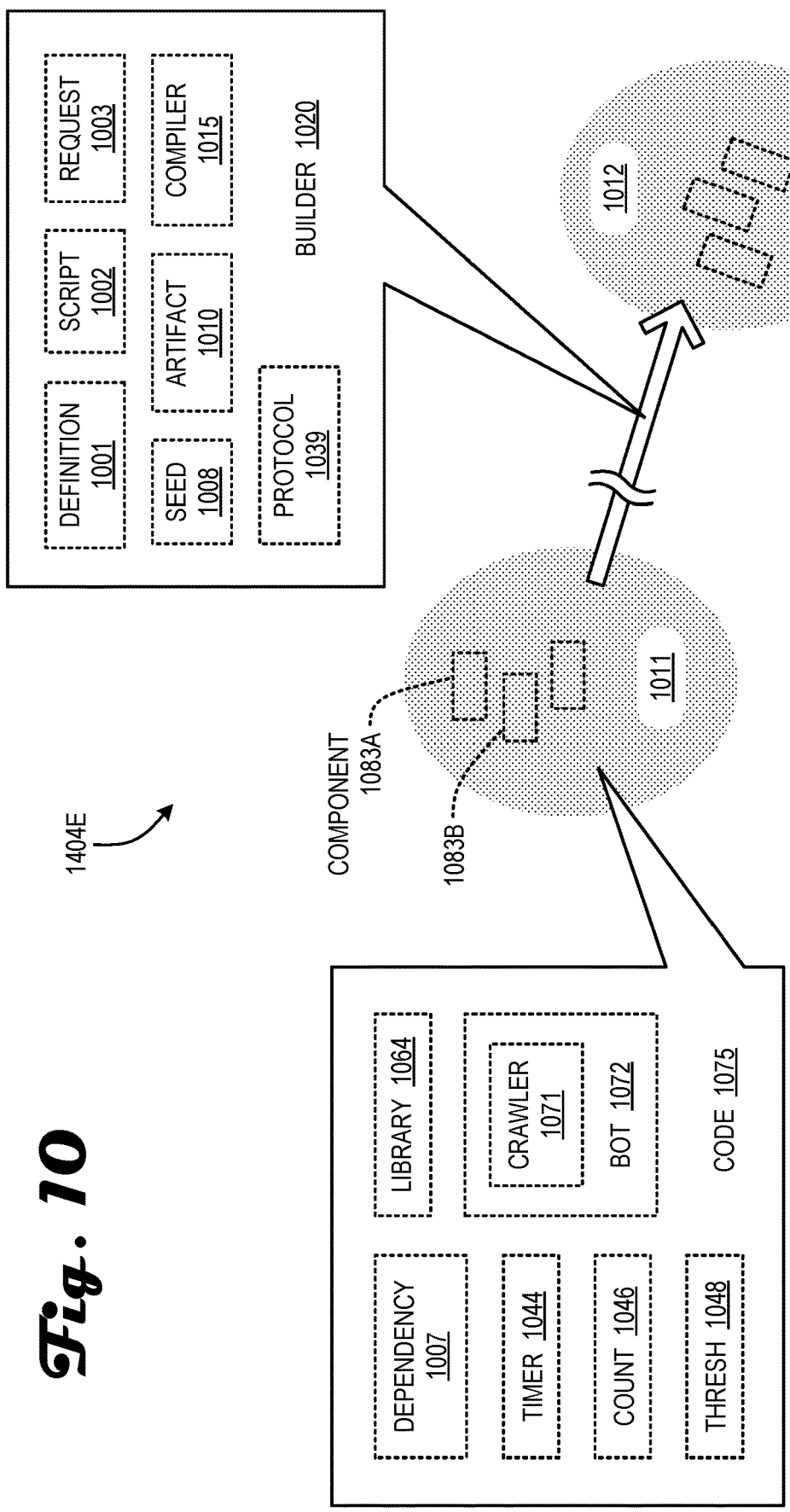
FIG. 10 schematically depicts a system in which salient aspects of a code migration may be implemented.

FIG. 10 schematically depicts salient aspects of a code migration 1404E in which one or more technologies may be implemented. This can occur, for example in a context in which one or more builders 1020 implement such a migration of some or all components 1083 in a build environment 611, 1011 are aliased one or more times as they are established (through one or more stages) in one or more respective destination environments 1012 of each. In some contexts code 1075 of a build environment 611, 1011 may include one or more instances of dependencies 1007 upon external resources; of timers 1044, of counts 1046 or thresholds 1048 used in assessing risk 949; of libraries 1064 or other binary resources 714 to be migrated; of memory or internet protocol (IP) addresses; of crawlers 1071 or other bots 1072 that detect and aggregate resources; or of other such build environment features and tools described herein.

Alternatively or additionally, such features and tools may comprise a builder 1020 as described herein. These may include one or more instances of definitions 1001 and other components of a script 1002; of requests 1003; of seeds 1008; of artifacts 1010, of compilers 1015; or of protocols 1039. Preparing for such a migration may, for example, include establishing (a version of) an operating system 716A in a first computing environment 911 monitored by a support interface 25A and (a version of) another operating system 716B in a second computing environment 912 also monitored by the first support interface 25A as further described below. Executing the migration 1404 may include establishing a second support interface 25B governing one or more destination environments 1012 so that a service disruption during the migration is minimized.

Figure 11:
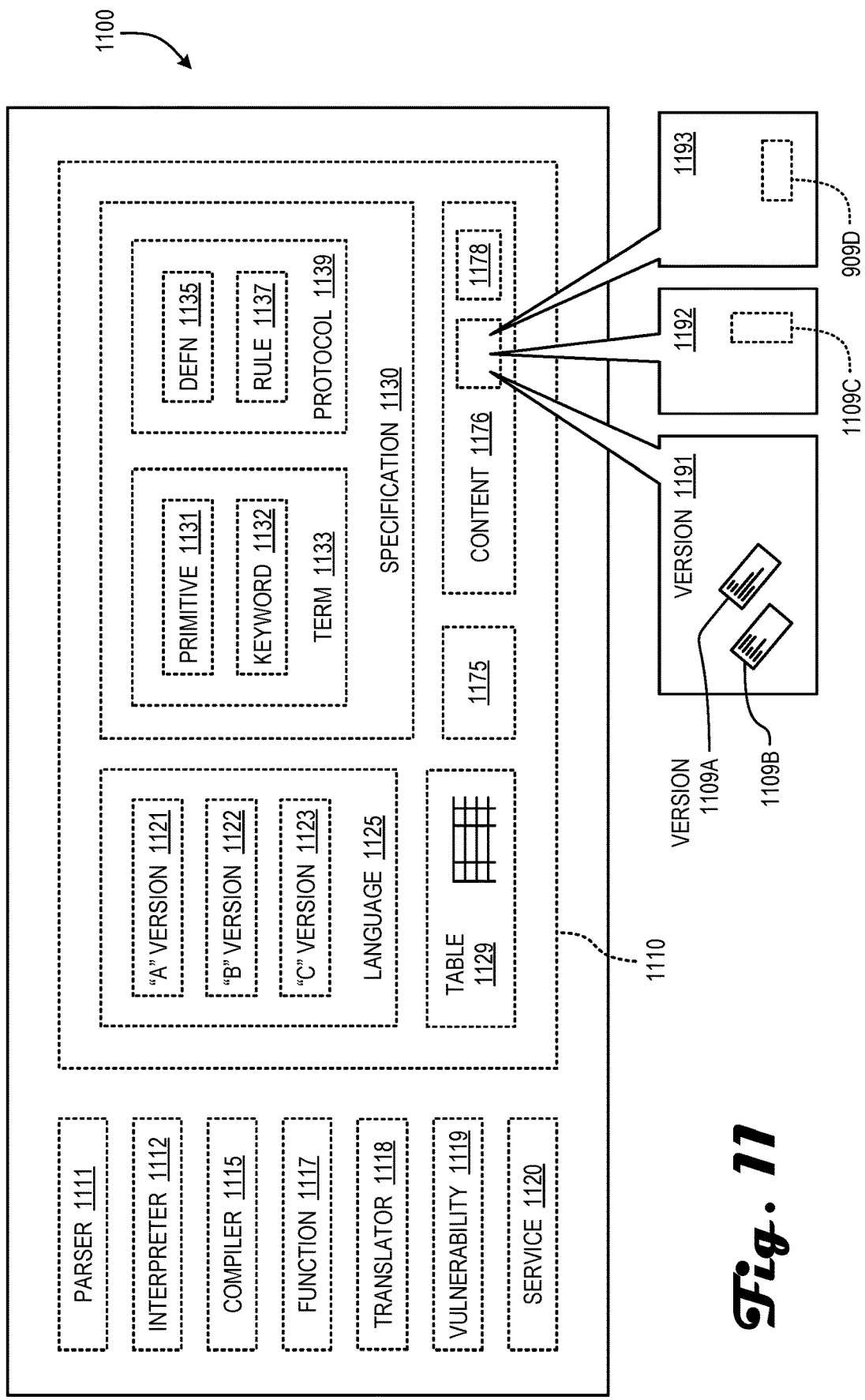
FIG. 11 depicts informational data borne by one or more data-handling media in which one or more improved technologies may be incorporated.

FIG. 11 schematically illustrates one or more memories or other data-handling media 1100 comprising one or more instances of parsers 1111, of interpreters 1112, of compilers 1115, of functions 1117, of translators 1118, of vulnerabilities 1119, of services 1120, or of other such digital entities in which one or more technologies may be implemented more safely. In some contexts, for example, such items may include various versions 1121-223 of polyscripted or other expressions of systematically diversified programming languages 1125 each at least partly defined by a respective (instance of a) language specification 1130. Most or all primitives 1131, keywords 1132, or other terms 1133 of each such language 1125 described herein correspond to one or more instances of definitions 1135, of rules 1137, or of other protocols 1139 of parsing, for example. Such relationships may be manifested in one or more dictionaries or other tables 1129, in programming code 1175, or in other content 176, 1176 such as polyscripting or other aliasing 1178 described herein. As used herein terms like "safer" describe a software object relative to another object, signaling that the software object lacks one or more (actual or apparent) attack-vector-vulnerabilities of the other object. In some instances 1110 of digital content 176, 1176 as described below, moreover, a version 1191 of an (original or other) early/prior environment 911 may be polyscripted or otherwise aliased such that respective instruction sequences 909A-B of the early/prior environment 911 may be migrated to become respective aliased versions 1109A-B in a later version 1191 of the early/prior environment 911. Likewise an instruction sequence 909C in a second environment 912 may be aliased using a different protocol during migration to become a differently aliased instruction sequence 909C in a second environment version 1192. In this way even if all remaining instruction sequences 1109C are simply migrated each to a corresponding new virtual environment version 1193 an effectively severed attack chain 930 is made more likely and one or more such instruction sequences 909 is made safer than it would otherwise be.

As used here an address range containing software may be "repurposed" by deleting one or more instructions 237 in it, installing one or more traps 381 into it, changing one or more digital permissions 956 that pertain to it, changing its owner or memory mapping, creating new entry points 275 into it, or other such environmental updates 340 that add to or remove its function(s) 1117 for a long period thereafter (i.e. of more than a day). An address range is not "repurposed" merely as an intended use nor by merely maintaining code correctness (e.g. by shifting an entry point 275 or other linkage 547 pursuant to a code migration 1404).

Figure 12:
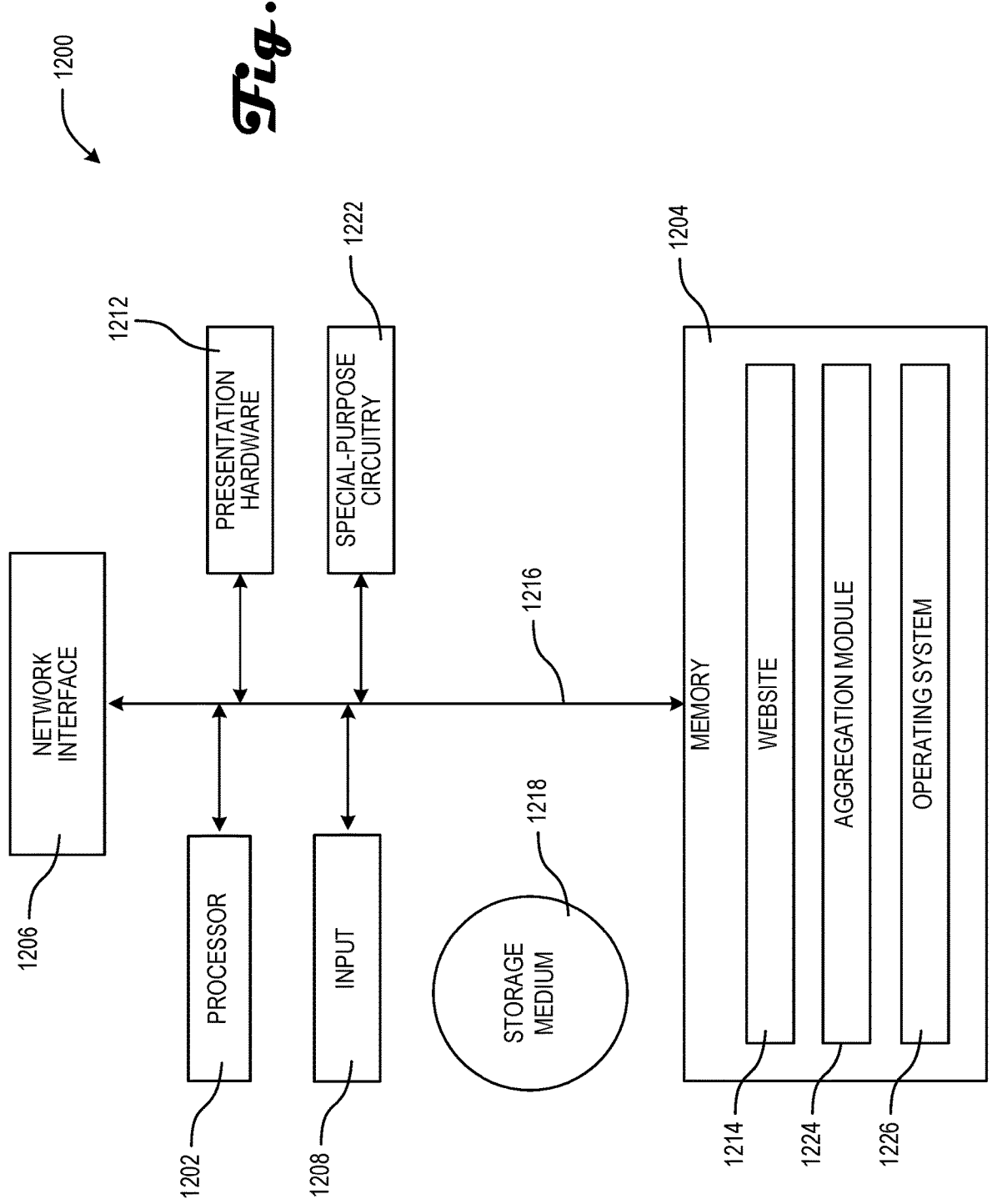
FIG. 12 schematically depicts a server in which one or more improved technologies may be incorporated.

Referring now to FIG. 12, there is shown a server 1200 in which one or more technologies may be implemented. Server 1200 may include one or more instances of processors 1202, of memories 1204, user inputs 1208, and of (speakers or other) presentation hardware 1212 all interconnected along with the network interface 1206 via a bus 1216. One or more network interfaces 1206 allow server 1200 to connect via the Internet or other networks 650). Memory 1204 generally comprises a random-access memory ("RAM"), a read only memory ("ROM"), and a permanent mass storage device, such as a disk drive.

Memory 1204 may contain one or more instances of websites 1214, of aggregation modules 1224, or of operating systems 1226. These and other software components may be loaded from a non-transitory computer readable storage medium 1218 into memory 1204 of the server 1200 using a drive mechanism (not shown) associated with a non-transitory computer readable storage medium 1218. In some embodiments, software or other digital components may be loaded via the network interface 1206, rather than via a computer readable storage medium 1218. Special-purpose circuitry 1222 may, in some variants, include some or all of the event-sequencing logic described herein. In some embodiments server 1200 may include many more components than those shown in FIG. 12, but it is not necessary that all conventional components of a server be shown in order to disclose an illustrative embodiment.

Figure 13:
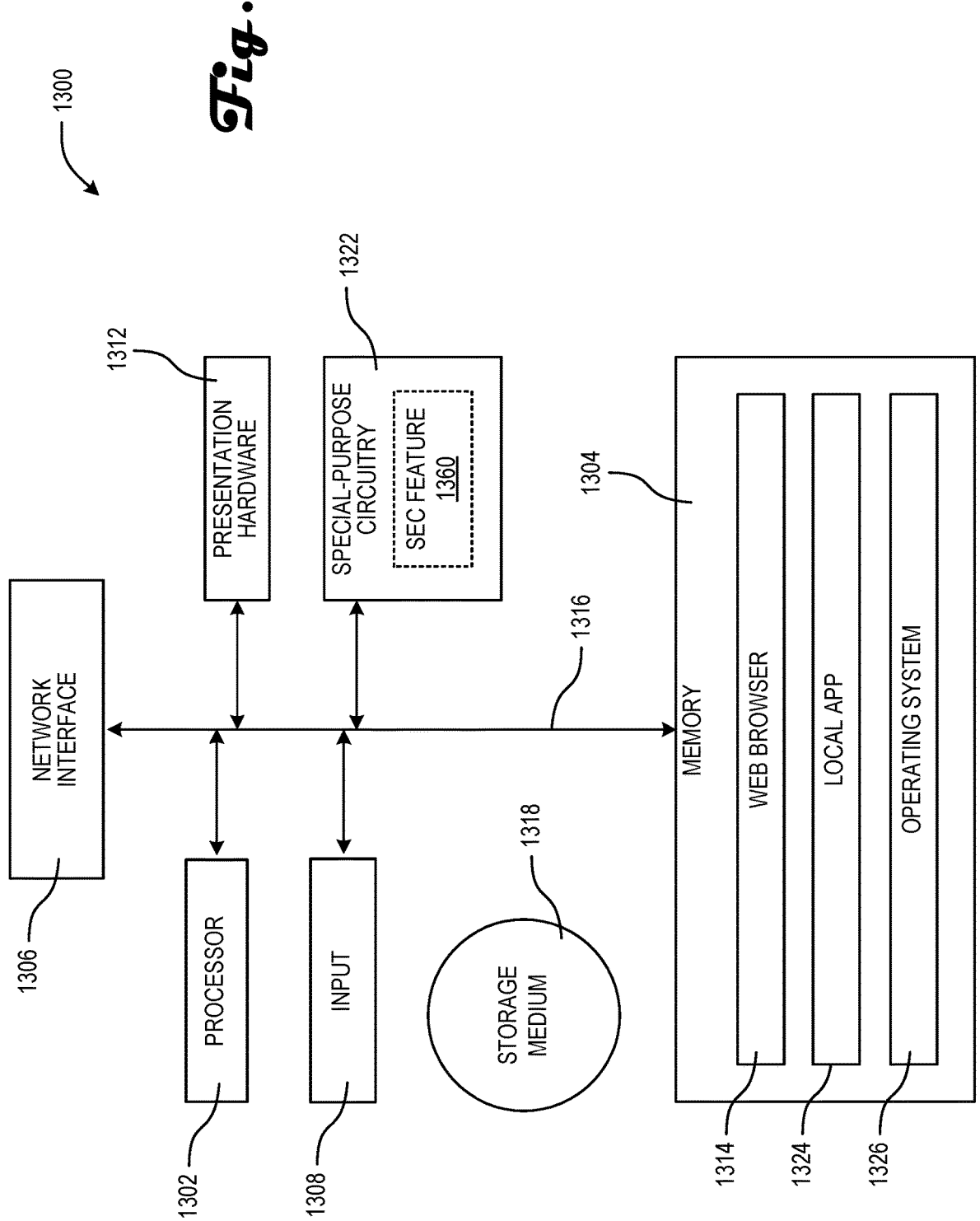
FIG. 13 schematically depicts a client device in which one or more improved technologies may be incorporated.

Referring now to FIG. 13, there is shown a client device 1300 in which one or more technologies may be implemented. Device 1300 may include one or more instances of processors 1302, of memories 1304, user inputs 1308, and of (speakers or other) presentation hardware 1312 all interconnected along with the network interface 1306 via a bus 1316. One or more network interfaces 1306 allow device 1300 to connect via the Internet or other networks 650). Memory 1304 generally comprises a random-access memory ("RAM"), a read only memory ("ROM"), and a permanent mass storage device, such as a disk drive.

Memory 1304 may contain one or more instances of web browsers 1314, of local apps 1324, or of operating systems 1326. These and other software components may be loaded from a non-transitory computer readable storage medium 1318 into memory 1304 of the device 1300 using a drive mechanism (not shown) associated with a non-transitory computer readable storage medium 1318. In some embodiments, software or other digital components may be loaded via the network interface 1306, rather than via a computer readable storage medium 1318. Special-purpose circuitry 1322 may, in some variants, include some or all of the event-sequencing logic described herein. In some embodiments device 1300 may include many more components than those shown in FIG. 13, but it is not necessary that all conventional components of a client device be shown in order to disclose an illustrative embodiment.

Figure 14:
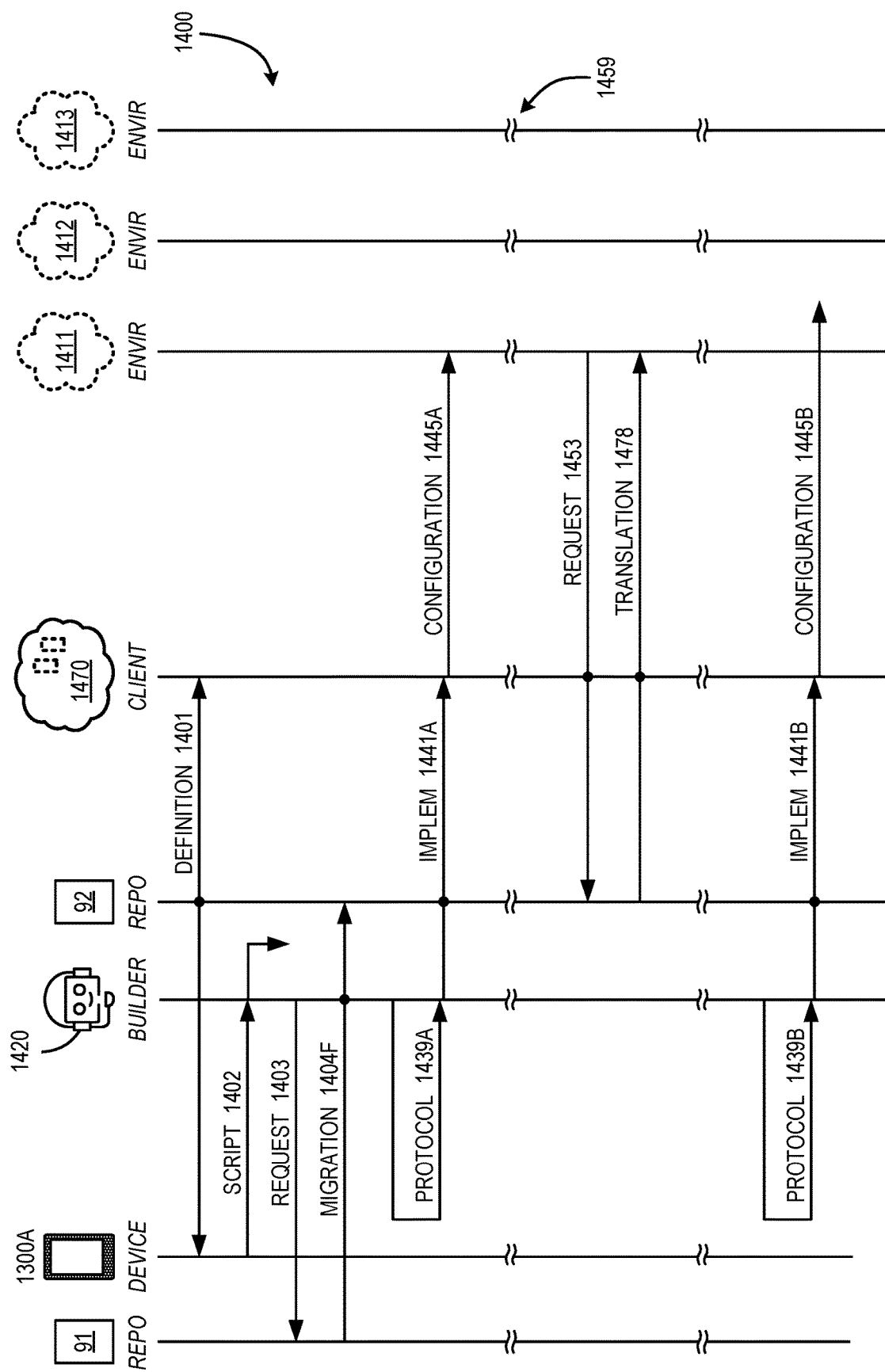
FIG. 14 depicts a flow diagram in which one or more improved technologies may be incorporated.

FIG. 14 depicts a data flow 1400 and particular scenario in which one or more improved technologies may be incorporated. A provider uses device 1300A to resolve a project definition 1401 in cooperation with (a network or other domain of) a destination client 1470 and one or more secure repositories 92. One or more scripts 1402 that manifest the project definition 1401 are thereafter executed by one or more builders 1020, triggering a request 1403 to one or more external repositories 91 from which there is a migration 1404F (e.g. of one or more missing components 1083) to the one or more secure repositories 92. The one or more scripts 1402 are also configured to implement an aliasing or other security protocol 1439A by which an implementation 1441A is performed that causes client 1470 to perform a configuration 1445A upon (at least) a first virtual environment 911. After some delay 1459 a request 1453 (e.g. for physical resource access such as data from repository 92) is received from environment 911, which request is examined via client 1470 as shown to ascertain whether any recognizable side effects 948 or other indicia of risk 949 are present. If not a response 959 to the request 1453 (e.g. a translation 1478) is returned to environment 911. After additional delay 1459 signaling one or more spawning criteria eventually being met (e.g. as detected by a recognition module 655) the one or more scripts 1402 may also implement an aliasing or other security protocol 1439B by which an implementation 1441B occurs by which client 1470 causes a configuration 1445B of one or more additional virtual environments 912, 913 as described below.

Figure 15:
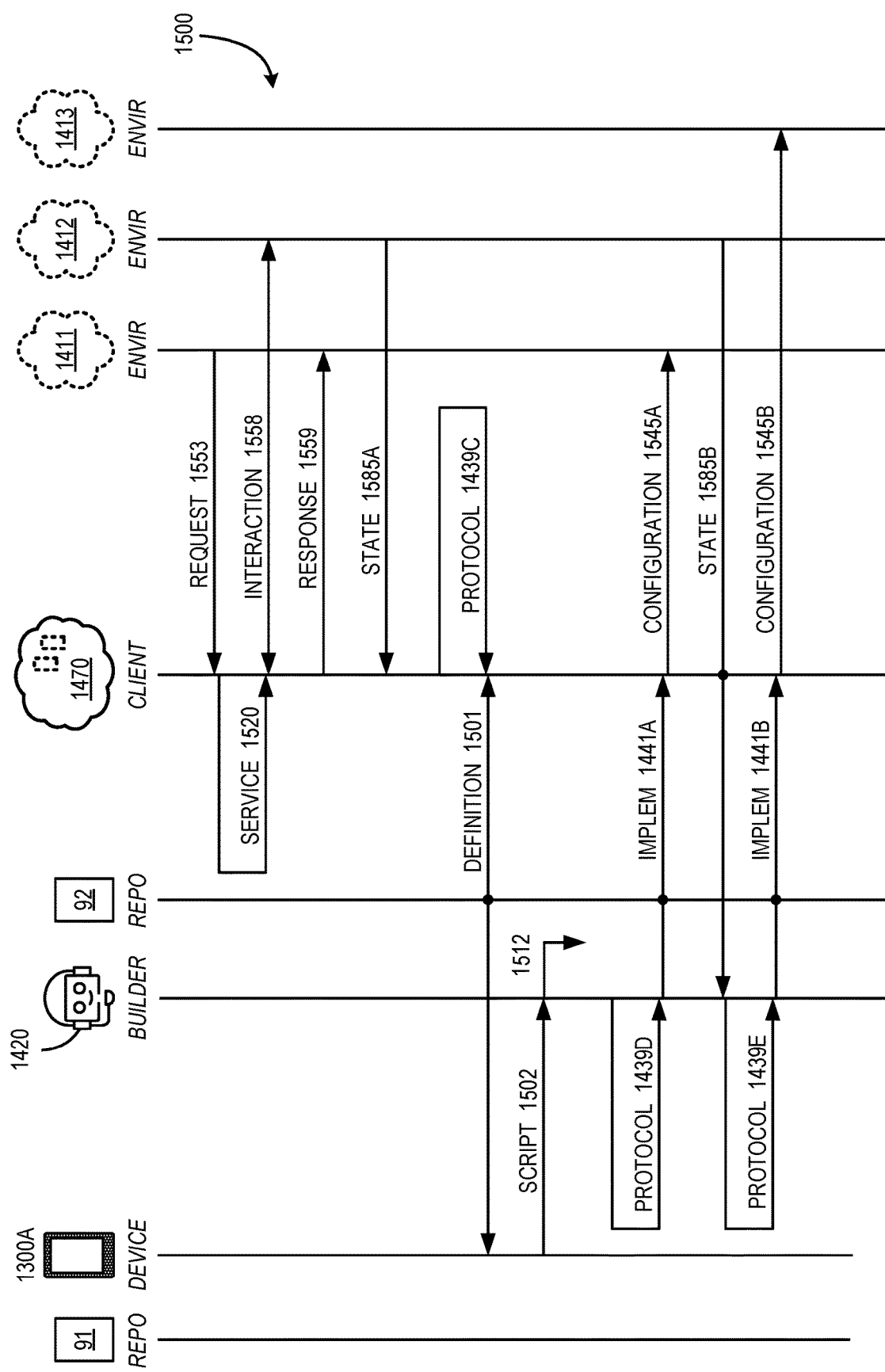
FIG. 15 depicts another flow diagram in which one or more improved technologies may be incorporated.

FIG. 15 depicts another data flow 1500 and particular scenario in which one or more improved technologies may be incorporated. A request 1553 (e.g. for interaction with one or more services 1120 of environment 912) is received from environment 911, which request is examined via client 1470 as shown (e.g. as service 1520) to ascertain whether any recognizable side effects 948 or other indicia of risk 949 are present. If not an interaction 1558 between client 1470 and (one or more services 1120 in) environment 912 occurs, permitting one or more responses 959, 1559 to be returned to the environment 911 from which the request 1553 originated. During that interaction 1558 or thereafter, (one or more services of) environment 912 also provides (one or more parameters 989 indicative of) state 885, 1585A as shown. See FIG. 16.

Figure 16:
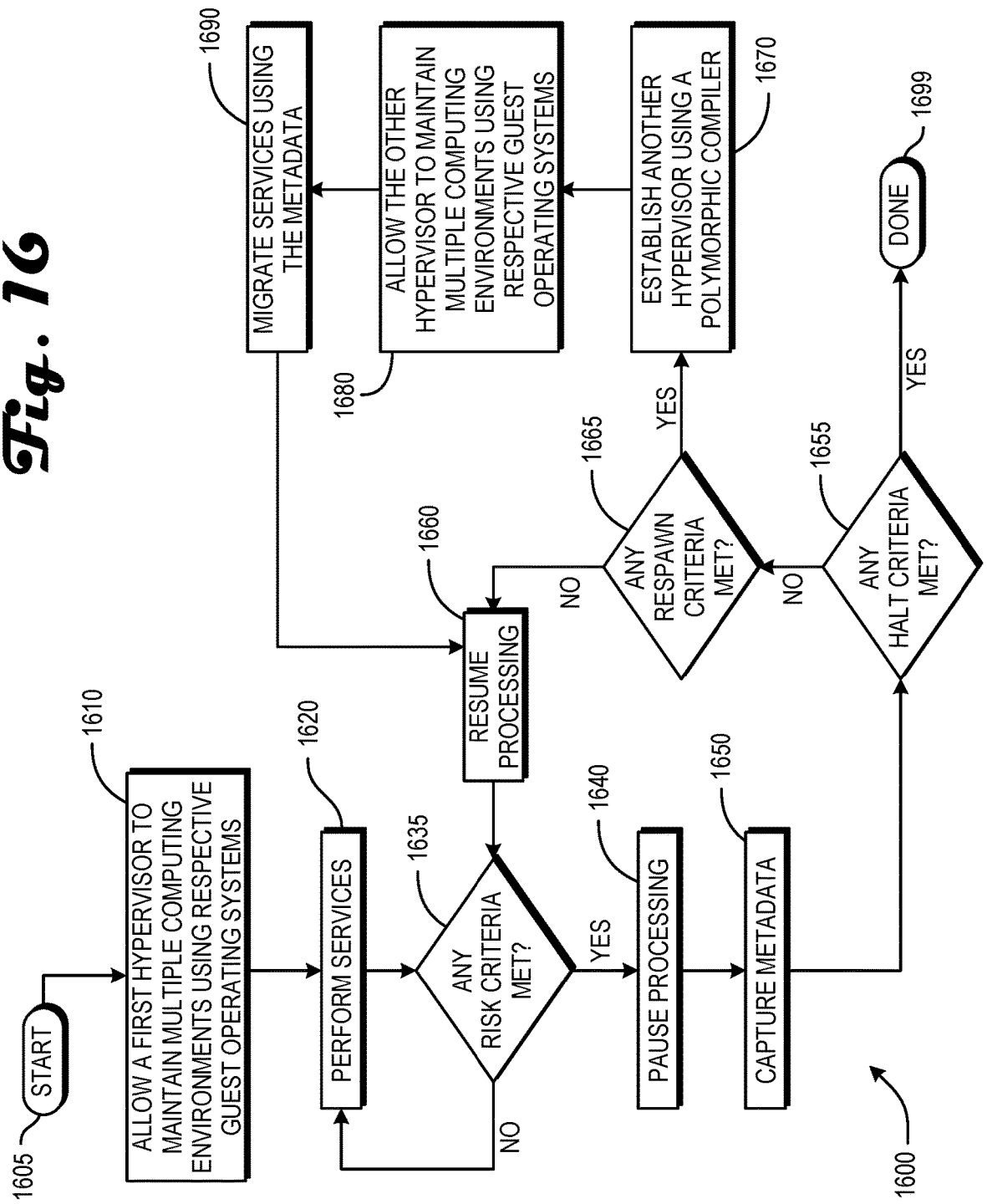
FIG. 16 depicts an operational flow in which one or more improved technologies may be incorporated.

FIG. 16 illustrates an operational flow 1600 suitable for use with at least one embodiment, such as may be performed on a server 1200 or client device 1300 (or both) using special-purpose circuitry 1222, 1322 thereof. As will be recognized by those having ordinary skill in the art, not all events of information management are illustrated in FIG. 16. Rather, for clarity, only those steps reasonably relevant to describing the security-enhanced computing interaction aspects of flow 1600 are shown and described. Those having ordinary skill in the art will also recognize the present embodiments are each merely one exemplary embodiment and that variations thereof may be made without departing from the scope of the broader inventive concept set forth in the clauses and claims below.

Following a start operation 1605, operation 1610 describes allowing a first hypervisor to maintain multiple computing environments using respective guest operating systems (e.g. one or more implementation modules 159 triggering, enabling, or otherwise selectively allowing a hypervisor 125 to maintain multiple computing environments 911, 912, 913 that each use one or more respective guest operating systems 716 or adapted versions 816 thereof). This can occur, for example, in a context in which one or more of the above-described systems 600, 700, 800, 900 are operably instantiated in or otherwise accessible to one or more build environments 611, 1011 described herein and in which one or more compilers 1015, 1115 described herein are thus configured to generate a security-enhanced hypervisor 125 using a polyscripting or other security enhancement protocol 1039 upon open source or other well-vetted hypervisor source code 1175. Alternatively or additionally, some instances of operation 1610 may be performed upon a conventional instance of a hypervisor 125 to protect content 176, 1176 or other resources 714A-B in such environments 911, 912, 913 that would otherwise be subject to an attack chain 930 that is carefully orchestrated over time.

Operation 1620 describes performing services (e.g. one or more virtual machines or other components 1083A-B performing user-requested application functions 1117 or other such services 1120 in the above-described computing environments 911, 912). This can occur, for example, in a context in which such computing environments 911, 912 are instances of containers 617 or virtual machines 618; in which one or more control modules 157 likewise each "perform" an instance of operation 1620 by triggering such components 1083A-B to perform operation 1620; in which hypervisor 125 comprises (human-unreadable) binary device-executable code such as machine language; and in which hypervisor 125 controls/monitors at least some such computing environments 911, 912 simultaneously and selectively.

Operation 1635 describes determining whether one or more risk criteria are met (e.g. one or more recognition modules 156 detecting an error message, warning, or other indicator 991 that a risk 949 has been detected). This can occur, for example, in a context in which the indicator 991 is Boolean; in which the applied risk criteria include one or more stack overflows 947 or other computational side effects 948 (or both). If no such risk criteria are detected/apparent, flow returns to operation 1620 so that one or more processes that support such service(s) can occur/continue. But if one or more such risk criteria are detected/apparent, flow continues to operation 1640.

Operation 1640 describes pausing processing (e.g. one or more control modules 157 signaling or otherwise causing hypervisor 125 to pause an application function 1117 or other service 1120 in a first operational state 885, 1585A in the first computing environment 911). This can occur, for example, in a context in which such a control module 657 exists within or is otherwise operably coupled to hypervisor 125. Flow then passes to operation 1650.

Operation 1650 comprises capturing metadata (e.g. an extraction module 656 obtaining a memory address 324, 984 or other metadata 328, 988 characterizes the state 885, 1585 of a service 1120 or other resource 714). This can occur, for example, in a context in which service 1120 is running on a first operating system 716A monitored by hypervisor 125 so that an operating parameter 989 (from or otherwise) relating to the first computing environment 911 characterizes the first operational state 885, 1585. Alternatively or additionally such an extraction module 656 may obtain such operating parameters 989 from a pattern recognition module 655 that detected one or more error events that signaled a potential vulnerability 919, 1119 at operation 1635. Flow then passes to operation 1655.

Operation 1655 describes determining whether one or more operational termination/halt criteria are met (e.g. another instance of a recognition module 655 detecting a catastrophic failure or other indicator 991 of a serious risk 949). This can occur, for example, in a context in which the indicator 991 is Boolean; in which one or more applied termination/halt criteria include an expanding attacker permission 956 or host privilege restriction 958 or other such modification 954 apparently in response 959 an attack or attack chain 930. If any such termination/halt criteria are detected/apparent, flow terminates at operation 1699. But if no such termination/halt criteria are detected/apparent, flow continues to operation 1665.

Operation 1665 describes determining whether one or more respawn criteria are met (e.g. yet another instance of a recognition module 655 detecting a maintenance timer 1044 or other event count 1046 reaching a threshold 1048 that has been associated with a prospective migration 1404 to a next hypervisor 725). This can occur, for example, in a context in which one or more such thresholds 1048 or other migration criteria are selected at inception by a system administrator or installation technician; in which the indicator 991 is Boolean; in which one or more applied respawn criteria include a transaction or usage count 1046 or similar indicated expenditure of resources 714; in which no catastrophic failure is required for such a migration 1404 to occur; and in which a particular attack chain 930 would otherwise result in a successful service interruption. If no such respawn criteria are detected/apparent, flow continues to operation 1660. But if any such respawn criteria are detected/apparent, flow continues to operation 1670.

Operation 1670 comprises establishing an other hypervisor using a polymorphic compiler (e.g. an implementation module 659 responding to the event count 1046 reaching a migration-indicative threshold 1048 by signaling one or more compilers 1015, 1115 to generate a next hypervisor 725). This can occur, for example, in a context in which the before and after hypervisors 125, 725 are respective compilations of exactly the same revision of hypervisor source code 1175 and in which a difference between the before and after hypervisors 125, 725 results from a corresponding difference between the before/source and after/destination probabilistic seed 1008 or between the before and after compilation protocol 1039 (or both).

Operation 1680 comprises allowing the other hypervisor to maintain multiple computing environments using respective guest operating systems (e.g. another instance of an implementation module 659 allowing the destination hypervisor 725 to maintain at least first and second destination environments 911, 912 that run on respective versions 816A-B of the pre-migration guest operating systems). This can occur, for example, in a context in which a polymorphed second version 816B of the pre-migration first operating system 716A is established in a destination first computing environment 911 monitored by the after/destination hypervisor 725; in which the first destination environment 911 runs on a polymorphic version 816A of the pre-migration guest operating system 716A; and in which such environment-specific polymorphing allows aliased versions 1109A-B of upstream components 1083A-B would otherwise require expensive analysis to sever one or more latent attack chains 930 alleviated by the environment-specific polymorphing. Alternatively or additionally, a second destination environment 912 may run concurrently on a polymorphic version 816B of another pre-migration guest operating system 716B.

Figure 17:
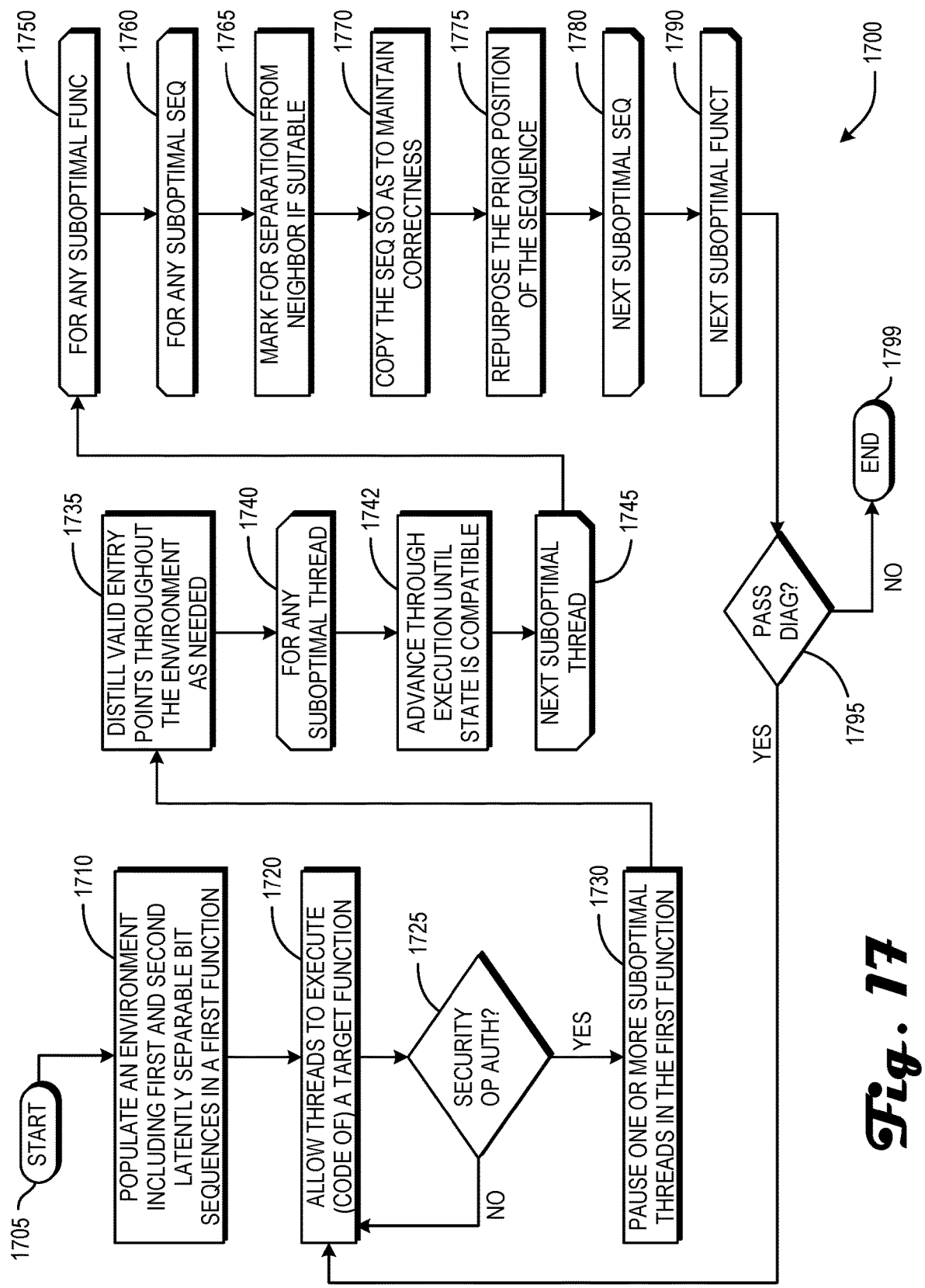
FIG. 17 depicts another operational flow in which one or more improved technologies may be incorporated.

FIG. 17 illustrates an operational flow 1700 suitable for use with at least one embodiment, such as may be performed on a server 1200 or client device 1300 (or both) using special-purpose circuitry 1222, 1322 thereof. As will be recognized by those having ordinary skill in the art, not all events of information management are illustrated in FIG. 17. Rather, for clarity, only those steps reasonably relevant to describing the security-enhanced computing interaction aspects of flow 1700 are shown and described. Those having ordinary skill in the art will also recognize the present embodiments are each merely one exemplary embodiment and that variations thereof may be made without departing from the scope of the broader inventive concept set forth in the clauses and claims below.

After an initial start operation 1705, operation 1710 describes populating an environment including first and second latently separable bit sequences in a first function (e.g. an implementation module 659 populating a container 617 or other environment 611, 911, 1011 including first and second latently separable bit sequences 151, 152 in an unparsed instance of a function 121). This can occur, for example, in a context in which the voltage configuration 689 manifests the code 175 or other content 176, 1176 and in which flow then passes to operation 1720.

As used herein a determination 335 is "new" as used herein if it was user-provided or programmatically generated within less than 24 hours. An ordinary file or function boundary, an interstitial stack between instruction sequences 209, or some similar longstanding manifestation of latent separability is not "new" nor is it a "determination" as described herein.

Operation 1720 describes allowing one or more threads to execute some or all of a target function (e.g. a response module 658 allowing one or more threads 301, 302 to execute some or all of a target function). This can occur, for example, in a context in which the voltage configuration 689 manifests the response 959 and in which flow then passes to operation 1725.

Operation 1725 describes determining whether an authorization exists for a security operation (e.g. a control module 657 determining whether an authorization exists for a security operation). This can occur, for example, in a context in which the voltage configuration 687 manifests authorizations received as user input 1208 and in which flow then passes back to operation 1720 if such authorization is absent. In some variants, for example, responsive authorization may be in effect so that snippet movement occurs in response to an apparent attack. Alternatively or additionally periodic authorization may be in effect so that snippet movement occurs every X hours by default, wherein 1<X<100. But in any case if authorization for snippet migration and related processing as described herein is present then flow passes to operation 1730.

Operation 1730 describes pausing one or more suboptimal threads in the first function (e.g. a process suspension module 654 pausing one or more suboptimal threads 301, 302 in the first function). This can occur, for example, in a context in which the voltage configuration 684 manifests (an identifier of) a "paused" or "active" mode for one or more encountered threads 301, 302 and in which flow then passes to operation 1735.

Operation 1735 describes distilling valid entry points throughout the environment as needed (e.g. a distillation module 656 listing and categorizing jumps, calls, or other entry points 275 throughout the environment 611, 911, 1011). This can occur, for example, in a context in which the voltage configuration 685 manifests one or more target categories of entry points 275; in which one or more such categories distinguish between conditional and unconditional entry points using one or more current criteria 323 designated by a user or algorithm; and in which flow then passes to operation 1740.

Operation 1740 describes executing one or more instruction sequences for a suboptimal thread if there are any (e.g. another instance of a response module 658 executing one or more instruction sequences for a suboptimal thread 301, 302 if there are any). This can occur, for example, if there is any thread 301 that should be allowed to finish before one or more code snippet movement protocols 1039, 1139, 1439 begin in a context in which a voltage configuration 688 therein manifests code for the update 340 and in which flow then passes to operation 1742.

Operation 1742 describes advancing through execution until a state of a thread or environment is compatible (e.g. process suspension and recognition modules 654, 655 jointly advancing through execution until a state 385A is compatible with migration of one or more code snippets). This can occur, for example, in a context in which the voltage configuration 684 manifests a state 385 of the environment 611, 911, 1011; in which the voltage configuration 685 manifests indicia of readiness or other criteria 323; and in which flow then passes to operation 1745.

Operation 1745 describes repeating a protocol if there is an other suboptimal thread to consider (e.g. another instance of a control module 657 repeating a protocol 1039, 1139, 1439 that began at operation 1740 if there is another instance of a suboptimal thread 301, 302). This can occur, for example, in a context in which the voltage configuration 687 manifests a Boolean determination and in which flow passes on to operation 1750 if there is not another thread 301 needing special handling (e.g. an exception handling thread 301 with a higher priority than routine preventive security).

Operation 1750 describes beginning a protocol for a suboptimal function if there are any (e.g. another instance of a response module 658 beginning a protocol 1039, 1139, 1439 for a suboptimal current target function 121, 122 if there are any). This can occur, for example, in a context in which the voltage configuration 688 manifests a protocol identifier 325 or address 324 and in which flow then passes to operation 1760 if there is any function 121, 122 that would apparently benefit from snippets therein being scrambled, swapped, or otherwise protectively reconfigured as described herein.

Operation 1760 describes beginning a protocol for a suboptimal sequence if there are any (e.g. another instance of a response module 658 beginning a protocol 1039, 1139, 1439 for a suboptimal sequence if there are any). This can occur, for example, in a context in which the voltage configuration 688 thereof manifests a protocol identifier 325 or address 324 and in which flow then passes to operation 1765 if there is any instruction sequence 162 that should be severed from and moved away from one or more neighboring instruction sequences 161 or other content 176 that might contain a latent ROP gadget 382 or other vulnerability 919, 1119 flowing from the proximity. Otherwise flow proceeds to operation 1790.

Operation 1765 describes marking a bit sequence for separation from its neighbor if suitable (e.g. invocation and recognition modules 651, 655 choosing neighboring bit sequences 151A-B, 152 for cutting/separation as described herein if suitable). This can occur, for example, in a context in which the voltage configuration 681 manifests one or more criteria 323 or addresses 324; in which the voltage configuration 685 manifests metadata 328, 988; and in which flow then passes to operation 1770.

Operation 1770 describes copying the sequence so as to establish or maintain correctness (e.g. if it is suitable or becomes suitable). This can occur, for example, in a context in which the voltage configuration 683 manifests a seed or other probabilistic feature; in which a resulting voltage configuration 689 manifests one or more criteria 323 or addresses 324 pertaining to a destination 157; and in which flow then passes to operation 1775.

Operation 1775 describes repurposing the prior position of the sequence (e.g. interface and implementation modules 652, 659 jointly repurposing the prior position of the sequence). This can occur, for example, in a context in which the voltage configuration 682 manifests an Application Programming Interface (API) call or other notification to be delivered via an interface; in which the voltage configuration 689 manifests metadata 328, 988 about the repurposing; and in which flow then passes to operation 1780.

Operation 1780 describes repeating a protocol that began at operation 1760 if there is another suboptimal sequence (e.g. another instance of a control module 657 repeating a protocol 1039, 1139, 1439 that began at operation 1760 if there is another suboptimal sequence in the current target function). This can occur, for example, in a context in which the voltage configuration 687 manifests one or more current criteria 323 that establish an "optimal" sequence and in which flow passes on to operation 1790 if no more sequences 151A-B, 152 of the current function 121 need to be marked, copied, or repurposed.

Operation 1790 describes repeating a protocol that began at operation 1750 if there is another suboptimal function (e.g. another instance of a control module 657 repeating a protocol 1039, 1139, 1439 that began at operation 1750 if there is another suboptimal function). This can occur, for example, in a context in which the voltage configuration 687 thereof manifests one or more current criteria 323 that establish an "optimal" status of function 121 and in which flow passes on to operation 1795 if no more functions 121, 122 contain any sequences 151A-B, 152 needing to be marked, copied, or repurposed.

Operation 1795 describes performing a diagnostic protocol (e.g. recognition and control modules 655, 657 jointly performing a diagnostic protocol 1039, 1139, 1439). This can occur, for example, in a context in which the voltage configuration 685 manifests one or more current criteria 323 that establish whether "correctness" has been established or preserved during a recent or in-progress migration; in which the voltage configuration 687 manifests a Boolean determination 335 indicating whether one or more qualifying errors or other outcomes have occurred; and in which flow then passes back to operation 1720 if no serious errors/failures are apparent. But if such errors/failures are present (e.g. signifying a potential attack chain 930 or other serious defect) normal operations terminate at operation 1799.

In light of teachings herein, numerous existing techniques may be applied for configuring special-purpose circuitry or other structures effective for securing, monitoring, connecting, analyzing, modeling, translating, recognizing, recording, retrieving, reverting, facilitating, and other operations as described herein without undue experimentation. See, e.g., U.S. Pat. No. 10,733,303 ("Polymorphic code translation systems and methods"); U.S. Pat. No. 10,701,213 ("Dynamically generating an aggregation routine"); U.S. Pat. No. 10,416,979 ("Package installation on a host file system using a container"); U.S. Pat. No. 10,382,424 ("Secret store for OAuth offline tokens"); U.S. Pat. No. 10,360,150 ("Techniques for managing memory in a multiprocessor architecture"); U.S. Pat. No. 10,356,155 ("Service onboarding"); U.S. Pat. No. 10,339,837 ("Distribution of scrambled binary output using a randomized compiler"); U.S. Pat. No. 10,142,453 ("User interface for a computing device"); U.S. Pat. No. 10,127,160 ("Methods and systems for binary scrambling"); U.S. Pat. No. 10,050,797 ("Inserting snapshot code into an application"); U.S. Pat. No. 10,033,604 ("Providing compliance/monitoring service based on content of a service controller"); U.S. Pat. No. 9,923,793 ("Client-side measurement of user experience quality"); U.S. Pat. No. 9,807,077 ("Systems and methods for containerized data security"); U.S. Pat. No. 9,665,474 ("Relationships derived from trace data"); U.S. Pat. No. 9,558,362 ("Data encryption using an external arguments encryption algorithm"); U.S. Pat. No. 9,483,590 ("User-defined application models"); U.S. Pat. No. 9,465,721 ("Snapshotting executing code with a modifiable snapshot definition"); U.S. Pat. No. 9,417,859 ("Purity analysis using white list/black list analysis"); U.S. Pat. No. 9,389,992 ("Multiple tracer configurations applied on a function-by-function level"); U.S. Pat. No. 9,292,415

("Module specific tracing in a shared module environment"); U.S. Pat. No. 9,286,042 ("Control flow graph application configuration"); U.S. Pat. No. 9,141,502 ("Method and system for providing high availability to computer applications"); U.S. Pat. No. 9,021,445 ("Tracer list for automatically controlling tracer behavior"); U.S. Pat. No. 8,978,016 ("Error list and bug report analysis for configuring an application tracer"); U.S. Pat. No. 8,966,462 ("Memory management parameters derived from system modeling"); U.S. Pat. No. 8,909,546 ("Privacy-centric ad models that leverage social graphs"); U.S. Pat. No. 8,849,968 ("Secure and stable hosting of third-party extensions to web services"); U.S. Pat. No. 8,775,437 ("Dynamic reranking of search results based upon source authority"); U.S. Pat. No. 8,694,574 ("Optimized settings in a configuration database with boundaries"); U.S. Pat. No. 8,656,378 ("Memorization configuration file consumed at compile time"); U.S. Pat. No. 8,656,135 ("Optimized memory configuration deployed prior to execution"); U.S. Pat. No. 8,650,538 ("Meta garbage collection for functional code"); U.S. Pat. No. 8,595,743 ("Network aware process scheduling"); U.S. Pat. No. 8,312,273 ("Privacy vault for maintaining the privacy of user profiles"); U.S. Pat. No. 8,014,308 ("Hardware architecture for cloud services"); and U.S. Pat. Pub. No. 20140274078 ("Protocols for facilitating broader access in wireless communications").

As used herein a "hypervisor" comprises one or more device-executable instruction sequences that create and run containers or other controlled computing environments such as virtual machines 618 (VMs) so as to allow at least one "host" computer (e.g. a server 1200 in a standalone or clustered configuration) to support multiple virtual environments concurrently (e.g. by virtually sharing at least one physical processor 1202 or physical memory 1204 in common therebetween). "Hypervisor" may also refer to source code from which such device-executable instruction sequences are generated.

Although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

In the numbered clauses below, all of the words and phrases used will be understood to one of ordinary skill as being either a natural language expression with a plain meaning or a term of art to be construed in light of statements herein. First combinations of aspects and embodiments are articulated in a shorthand form such that (1) according to respective embodiments, for each instance in which a "component" or other such identifiers appear to be introduced (e.g., with "a" or "an,") more than once in a given chain of clauses, such designations may either identify the same entity or distinct entities; and (2) what might be called "dependent" clauses below may or may not incorporate, in respective embodiments, the features of "independent" clauses to which they refer or other features described above.

CLAUSES

1. A security enhancement method pertaining to first and second bit sequences 151, 152 both within a first (file, function 121, or other) digital object wherein the method comprises:
   invoking transistor-based circuitry (e.g. protocol invocation, recognition, and response modules 651, 655, 658 jointly) configured to obtain a (so-called) first determination 335 that a first instance 141 of the first bit sequence 151A, 151B and a first instance 141 of the second bit sequence 152 are separable; and
   invoking transistor-based circuitry (e.g. an API interface or other invocation module 651) configured to cause a reconfiguration/repurposing of a position 177A of the first instance 141 of the second bit sequence 152.

2. The method of any one of the above Clauses wherein the first determination 335 is integer-valued or text-valued (e.g. wherein "TRUE" or one is defined as an affirmative outcome and one or more other values are negative).

3. The method of any one of the above Clauses wherein the first determination 335 is obtained as a component of a moving target defense.

4. The method of any one of the above Clauses wherein the invoking the transistor-based circuitry configured to cause the reconfiguration/repurposing of the position 177 of the first instance 141 of the second bit sequence 152 comprises:
   actually repurposing the position 177 of the first instance 141 of the second bit sequence 152.

5. The method of any one of the above Clauses wherein the invoking the transistor-based circuitry configured to cause the reconfiguration/repurposing of the position 177 of the first instance 141 of the second bit sequence 152 comprises:
   actually causing the position 177 of the first instance 141 of the second bit sequence 152 to be reconfigured or otherwise modified.

6. The method of any one of the above Clauses wherein the invoking the transistor-based circuitry configured to cause the reconfiguration/repurposing of the position 177 of the first instance 141 of the second bit sequence 152 comprises:
   causing content 176 (adjacent or otherwise) at the position 177A of the first instance 141 of the second bit sequence 152 to be changed after the second bit sequence 152 is instantiated at the first destination 157A thereof after the first determination 335 that the first instance 141 of the first bit sequence 151A, 151B and the first instance 141 of the second bit sequence 152 are separable.

7. The method of any one of the above Clauses wherein the invoking the transistor-based circuitry configured to cause the reconfiguration/repurposing of the position 177 of the first instance 141 of the second bit sequence 152 comprises:
   causing content 176 in the position 177A of the first instance 141 of the second bit sequence 152 to be changed after the second bit sequence 152 is instantiated at the first destination 157A thereof as a conditional response 959 to the first determination 335 that the first instance 141 of the first bit sequence 151A, 151B and the first instance 141 of the second bit sequence 152 are separable (at least partly) based on an application of one or more separability-indicative criteria 323.

8. The method of any one of the above Clauses wherein the invoking the transistor-based circuitry configured to cause the reconfiguration/repurposing of the position 177 of the first instance 141 of the second bit sequence 152 comprises:

causing content 176 within the position 177A of the first instance 141 of the second bit sequence 152 to be (erased or otherwise) changed after the second bit sequence 152 is instantiated at the first destination 157A thereof as a conditional response 959 to the first determination 335 that the first instance 141 of the first bit sequence 151A, 151B and the first instance 141 of the second bit sequence 152 are separable based on an application of one or more separability-indicative criteria 323.

9. The method of any one of the above Clauses wherein the invoking the transistor-based circuitry configured to cause the reconfiguration/repurposing of the position 177 of the first instance 141 of the second bit sequence 152 comprises:

causing content at the position 177A to be changed after the second bit sequence 152 is instantiated at the first destination 157A thereof as a conditional response 959 to the first determination 335 that the first instance 141 of the first bit sequence 151A, 151B and the first instance 141 of the second bit sequence 152 are separable less than 30 days after the determination 335 that the first digital object is ready for subdivision.

10. The method of any one of the above Clauses wherein the invoking the transistor-based circuitry configured to cause the reconfiguration/repurposing of the position 177 of the first instance 141 of the second bit sequence 152 comprises:

causing content at the position 177A to be changed after the second bit sequence 152 is instantiated at the first destination 157A thereof as a conditional response 959 to the first determination 335 (at least) that the first instance 141 of the first bit sequence 151A, 151B and the first instance 141 of the second bit sequence 152 are separable less than 7 days after the determination 335 that the first digital object is ready for subdivision.

11. The method of any one of the above Clauses wherein the invoking the transistor-based circuitry configured to cause the reconfiguration/repurposing of the position 177 of the first instance 141 of the second bit sequence 152 comprises:

causing content at the position 177A to be changed after the second bit sequence 152 is instantiated at the first destination 157A thereof as a conditional response 959 to the first determination 335 that the first instance 141 of the first bit sequence 151A, 151B and the first instance 141 of the second bit sequence 152 are separable less than 24 hours after the determination 335 that the first digital object is ready for subdivision.

12. The method of any one of the above Clauses wherein the invoking the transistor-based circuitry configured to cause the reconfiguration/repurposing of the position 177 of the first instance 141 of the second bit sequence 152 comprises:

causing content at the position 177A to be changed after the second bit sequence 152 is instantiated at the first destination 157A thereof as a conditional response 959 to the first determination 335 that the first instance 141 of the first bit sequence 151A, 151B and the first instance 141 of the second bit sequence 152 are separable less than 2 hours after the determination 335 that the first digital object is ready for subdivision.

13. The method of any one of the above Clauses comprising:

invoking transistor-based circuitry (e.g. an instance of a parser 1111, decompiler, or other extraction module 656) configured to parse one or more machine code instruction sequences 261 resident in the first and second bit sequences 151A-B, 152.

14. The method of any one of the above Clauses comprising:

invoking transistor-based circuitry (e.g. a separability-indicative instance of a recognition module 655) configured to obtain a determination 335 whether or not the first and second bit sequences 151, 152 are suitable for separation by applying one or more separability-indicative criteria 323 as described herein.

15. The method of any one of the above Clauses comprising:

invoking transistor-based circuitry (e.g. another separability-indicative instance of a recognition module 655) configured to obtain a determination 335 whether or not the first and second bit sequences 151, 152 are suitable for separation by applying one or more separability-indicative criteria 323 that include detecting that unconditionally terminal code 175 (e.g. ending with an outbound entry point 275 or other such machine code 175) that will block any potential downstream progression therefrom is positioned after a downstream-most entry point of a more-upstream code sequence 151A (e.g. having a lower memory address 324) and before an entry point of a more-downstream code sequence 152 (e.g. having a higher memory address 324).

16. The method of any one of the above Clauses comprising:

obtaining a determination 335 that the first and second bit sequences 151B, 152 are suitable for separation by applying one or more separability-indicative criteria 323 that include detecting that unconditionally terminal code 175 (e.g. ending with an outbound entry point 275 or other such machine code 175) that will block any potential downstream progression therefrom is positioned after a downstream-most entry point of a more-upstream code sequence 152 (e.g. having a lower memory address 324) and before an entry point of a more-downstream code sequence 151B (e.g. having a higher memory address 324) so as to avoid creating a Return-Oriented-Programming (ROP) gadget 382 of potential utility in an attack chain 930.

17. The method of any one of the above Clauses comprising:

invoking transistor-based circuitry (e.g. a readiness-indicative instance of a recognition module 655) configured to obtain a determination 335 that the first digital object is ready for subdivision by applying one or more readiness-indicative criteria 323 to one or more threads 301, 302 in an environment that includes the first digital object.

18. The method of any one of the above Clauses comprising:

invoking transistor-based circuitry (e.g. an instance of interface, randomization, and implementation modules 652, 653, 659 jointly) configured to preserve correctness of the first bit sequence 151 to the second bit sequence 152 at least by modifying a first feature of an entry point 275 into the second bit sequence 152 that resides in the first bit sequence 151A, 151B to refer to a second instance 142 of the second bit sequence 152 at a first destination 157 of the second bit sequence 152.

19. The method of any one of the above Clauses comprising:

invoking transistor-based circuitry (e.g. another implementation module 659) configured to repurpose a position 177 of the first instance 141 of the first bit sequence 151A, 151B after the first bit sequence 151 is instantiated at a first destination 157B of the first bit sequence 151A, 151B.

20. The method of any one of the above Clauses comprising:

invoking transistor-based circuitry (e.g. another implementation module 659) configured to repurpose a position 177 of the first instance 141 of the first bit sequence 151A, 151B after the first bit sequence 151 is instantiated at a first destination 157B of the first bit sequence 151A, 151B.

21. The method of any one of the above Clauses wherein (at least one instance of) invoking transistor-based circuitry configured to repurpose the particular position 177 of the first instance 141 of the first bit sequence 151 (is included and) occurs after transistor-based circuitry configured to instantiate the first bit sequence 151 at a first destination 157 (of a migration as described herein) thereof is invoked.

22. The method of any one of the above Clauses wherein (at least one instance of) invoking transistor-based circuitry configured to repurpose the particular position 177 of the first instance 141 of the second bit sequence 152 occurs after (at least one instance of) transistor-based circuitry configured to instantiate the second bit sequence 152 at a first destination 157 is invoked.

23. The method of any one of the above Clauses wherein (at least one instance of) invoking transistor-based circuitry configured to repurpose the particular position 177 of the first instance 141 of the first bit sequence 151 occurs after (at least one instance of) first bit sequence 151 arrives at a first destination 157 thereof.

24. The method of any one of the above Clauses wherein (at least one instance of) invoking transistor-based circuitry configured to repurpose the particular position 177 of the first instance 141 of the second bit sequence 152 (is included and) occurs after second bit sequence 152 arrives at a first destination 157 thereof (of an early or late migration as described herein).

25. The method of any one of the above Clauses comprising:

parsing of one or more machine code instruction sequences 261 resident in the first bit sequence 151; and preserving correctness of the first bit sequence 151 to the second bit sequence 152 by modifying a first feature (e.g. argument 238) of an entry point 275 into the second bit sequence 152 that resides in the first bit sequence 151A, 151B to refer (directly or otherwise) to a second instance 142 of the second bit sequence 152 at a first destination 157 of the second bit sequence 152.

26. The method of any one of the above Clauses comprising:

parsing one or more machine code instruction sequences 261 resident in the first bit sequence 151; and preserving correctness of (one or more linkages 546 in) the first bit sequence 151 to the second bit sequence 152 by modifying a first feature (e.g. argument 238) of an entry point 275 into the second bit sequence 152 that resides in the first bit sequence 151A, 151B to refer directly or otherwise to a second instance 142 of the second bit sequence 152 at a destination 157 of the second bit sequence 152.

27. The method of any one of the above Clauses comprising:

parsing one or more machine code instruction sequences 261 resident in the first bit sequence 151; and preserving correctness of the first bit sequence 151 to the second bit sequence 152 by modifying a first argument 238 of an entry point 275 into the second bit sequence 152 that resides in the first bit sequence 151A, 151B to refer to a second instance 142A of the second bit sequence 152 at a first destination 157 of the second bit sequence 152.

28. The method of any one of the above Clauses comprising:

parsing one or more machine code instruction sequences 262 resident in the second bit sequence 152; and preserving correctness of (one or more linkages 546 in) the second bit sequence 152 to the first bit sequence 151A, 151B by modifying a first feature (e.g. argument 238) of an entry point 275 into the first bit sequence 151A, 151B that resides in the second bit sequence 152 to refer indirectly (e.g. through a trampoline 339, 539) to a second instance 142 of the first bit sequence 151A, 151B.

29. The method of any one of the above Clauses comprising:

parsing one or more machine code instruction sequences 262 resident in the second bit sequence 152; and preserving correctness of the second bit sequence 152 to the first bit sequence 151B by modifying a first feature (e.g. argument 238) of an entry point 275 into the first bit sequence 151B that resides in the second bit sequence 152 to refer through (linkages 546A-B of FIG. 5 and also through at least) a trampoline 539 to an other instance 143B of the first bit sequence 151B at a destination 157E of the first bit sequence 151B.

30. The method of any one of the above Clauses comprising:

repurposing a position 177C of the first instance 141 of the first bit sequence 151A after the first bit sequence 151A is instantiated (as a second instance 142C of bit sequence 151A at) at a first destination 157C thereof; and repurposing a position 177A of the first instance 141 of the second bit sequence 152 after the second bit sequence 152 is instantiated (as a second instance 142 of bit sequence 152 at) at a first destination 157A thereof (e.g. see FIG. 5).

31. The method of any one of the above Clauses comprising:

repurposing a (current or former) position 177A of the first instance 141 of the second bit sequence 152 after copying the second bit sequence 152 to (become a second instance 142A at) a first destination 157A; and repurposing a position 177B of the first instance 141 of the first bit sequence 151B after copying the first bit sequence 151B to (become a second instance 142 at) a first destination 157B.

32. The method of any one of the above Clauses wherein the first determination 335 that the first instance 141 of the first bit sequence 151A, 151B and the first instance 141 of the second bit sequence 152 are separable is (at least partly) based on a determination 335 that the first and second bit sequences 151A-B, 152 are suitable for separation.

33. The method of any one of the above Clauses wherein the first determination 335 that the first instance 141 of the first bit sequence 151A, 151B and the first instance 141 of the second bit sequence 152 are separable is (at least partly) based on a determination 335 that the first digital object is ready for subdivision.

34. The method of any one of the above Clauses wherein the first determination 335 that the first instance 141 of the first bit sequence 151A, 151B and the first instance 141 of the second bit sequence 152 are separable is received as input 1208, 1308 from a builder 1420 or other authorized decisionmaker who recently received metadata 328 (i.e. within less than 7 days) relating to one or more separability-indicative criteria 323.

35. The method of any one of the above Clauses wherein the first determination 335 that the first instance 141 of the first bit sequence 151A, 151B and the first instance 141 of the second bit sequence 152 are separable is received as input 1208, 1308 from a builder 1420 or other authorized decisionmaker who recently received metadata 328 (i.e. within less than 7 days) relating to one or more readiness-indicative criteria 323.

36. The method of any one of the above Clauses wherein the first determination 335 that the first instance 141 of the first bit sequence 151A, 151B and the first instance 141 of the second bit sequence 152 are separable is a confirmatory determination (at least partly) based on metadata 328 comprising an automatically generated suggestion that the first and second bit sequences 151A-B, 152 are suitable for separation.

37. The method of any one of the above Clauses wherein the first determination 335 that the first instance 141 of the first bit sequence 151A, 151B and the first instance 141 of the second bit sequence 152 are separable is a confirmatory determination (at least partly) based on metadata 328 comprising an automatically generated suggestion that the first digital object is ready for subdivision.

38. The method of any one of the above Clauses wherein the first determination 335 that the first instance 141 of the first bit sequence 151A, 151B and the first instance 141 of the second bit sequence 152 are separable is related to one or more readiness-indicative criteria 323 automatically applied (e.g. by a recognition module 655 containing same) by virtue of a builder 1420 or other authorized resource that provides the first determination 335 having earlier received an outcome set 333 from the one or more readiness-indicative criteria 323 having been applied.

39. The method of any one of the above Clauses wherein the first determination 335 that the first instance 141 of the first bit sequence 151A, 151B and the first instance 141 of the second bit sequence 152 are separable is related to one or more separability-indicative criteria 323 automatically applied (e.g. by a recognition module 655 containing same) by virtue of a builder 1420 or other authorized resource that provides the first determination 335 having earlier received an outcome set 333 from the one or more separability-indicative criteria 323 having been applied.

40. The method of any one of the above Clauses wherein an entirety of the first digital object is smaller than half of all distinct (memory or other) data-holding addresses 324 defined in a computing environment in which it resides.

41. The method of any one of the above Clauses wherein an entirety of the first digital object is (at least mapped as) a single contiguous series of bits.

42. The method of any one of the above Clauses wherein an entirety of the first digital object resides entirely on a single (memory 1204, 1304 or other) physical medium 1100.

43. The method of any one of the above Clauses wherein the invoking the transistor-based circuitry configured to obtain the first Boolean determination 335 that the (first instances 141 of the) first and second bit sequences 151, 152 are separable comprises:

obtaining the new first Boolean determination 335 that the first instances 141 of the first and second bit sequences 151, 152 are separable by invoking transistor-based circuitry (e.g. one or more recognition, extraction, control, and response modules 655-658 jointly) configured to obtain a new determination 335 as the first Boolean determination 335 that the first instances 141 of the first and second bit sequences 151, 152 are separable within 24 hours after (decompiling one or more machine code instruction sequences 209, 609 within and in a vicinity 179 of the first bit sequence 151 or otherwise causing at least) a parsing of one or more machine code instruction sequences 209B resident in the second bit sequence 152 that identifies (directly or otherwise) a set 333 of one or more entry points 275 therefrom into the first instance 141 of the first bit sequence 151A-B.

44. The method of any one of the above Clauses wherein obtaining a new first Boolean determination 335 that the first instances 141 of the first and second bit sequences 151, 152 are separable (is included and) comprises:

invoking the transistor-based circuitry configured to obtain the first Boolean determination 335 that the first instances 141 of the first and second bit sequences 151, 152 are separable after decompiling one or more machine code instruction sequences 209B resident in the second bit sequence 152 that so as to identify a set 333 of one or more entry points 275 therefrom into the first instance 141 of the first bit sequence 151A-B.

45. The method of any one of the above Clauses comprising:

invoking transistor-based circuitry (e.g. one or more interface modules 652 configured to conduct a programmatic dialogue with a user and thereby) configured to obtain a new (confirmation or other new) first Boolean determination 335 that the first instances 141 of the first and second bit sequences 151, 152 are currently separable.

46. The method of any one of the above Clauses wherein a (hypervisor 625 or other) support interface 25A includes one or more instruction sequences 209, 609 of the second bit sequence 152 as a component of a moving target defense of the support interface 25A.

47. The method of any one of the above Clauses wherein a first hypervisor 625 includes one or more instruction sequences 209, 609 of the second bit sequence 152 as a component of a moving target defense of the first hypervisor 625.

48. The method of any one of the above Clauses wherein an instance of a hypervisor 725 includes a thread 303 that executes one or more instruction sequences 209, 609 of the second bit sequence 152 in an environment 711A that includes a digital object that includes the one or more instruction sequences 209, 609.

49. The method of any one of the above Clauses comprising:

obtaining a paused first thread 301 by pausing a first active thread executing the first bit sequence 151 while another active thread is also paused while executing the first bit sequence 151.

50. The method of any one of the above Clauses comprising:

invoking transistor-based circuitry (e.g. process suspension, recognition, and control modules 654, 655, 657 jointly) configured to obtain a paused first thread 301 by pausing a first active thread executing (code 175 somewhere in) the first bit sequence 151 and concurrently to obtain a paused second thread 302 by pausing a second active thread executing (code 175 somewhere in) the second bit sequence 152 and thereafter to allow the first paused thread 301 to resume and execute completely (e.g. by executing one or more utility threads 303) while the second thread 302 remains paused.

51. The method of any one of the above Clauses comprising:

obtaining a paused first thread 301 by pausing a first active thread executing (code 175 somewhere in) the first bit sequence 151 and to obtain a paused second thread 302 by pausing a second active thread executing (code 175 somewhere in) the second bit sequence 152 and thereafter to allow the first paused thread 301 to resume and execute an entirety thereof (e.g. by executing one or more utility threads 303) while the second thread 302 remains paused;

modifying the paused second thread 302 (e.g. by executing one or more utility threads 303) so that the second thread 302 refers to another instance 143 of the second bit sequence 152 at a particular destination 157 thereof (1) after instantiating the second bit sequence 152 at the particular destination 157B, 157E thereof and (2) after repurposing a particular (vacated or other) first position 177A of the first instance 141 of the second bit sequence 152 both; and (triggering or otherwise) allowing the execution of the paused second thread 302 to resume.

52. The method of any one of the above Clauses comprising:

invoking transistor-based circuitry (e.g. a process suspension module 654) configured to obtain at least a paused first thread 301 by pausing a first active thread executing (an instance of code 175 somewhere in) the first bit sequence 151; and invoking transistor-based circuitry (e.g. another process suspension module 654) configured to obtain at least a paused second thread 302 by pausing (at least) a second active thread executing the second bit sequence 152.

53. The method of any one of the above Clauses comprising:

obtaining at least a paused first thread 301, 302 by pausing (at least) a first active thread executing (code 175 somewhere in) the first bit sequence 151.

54. The method of any one of the above Clauses wherein instantiating the first bit sequence 151 the first position 177 of the first instance 141 of the first bit sequence 151A-B comprises:

copying the first bit sequence 151 to become a second instance 142 of the first bit sequence 151 at a first destination 157A further from the first (original or other) position 177 of the first instance 141 of the second bit sequence 152 than the first instance 141 was.

55. The method of any one of the above Clauses wherein instantiating the first bit sequence 151 the first position 177 of the first instance 141 of the first bit sequence 151A-B comprises:

copying the first bit sequence 151 further from a particular (current or former) first position 177 of the first instance 141 of the second bit sequence 152 to become another instance 143 of the first bit sequence 151 at a first destination 157A after the first bit sequence 151 has been repurposed.

56. The method of any one of the above Clauses wherein instantiating the first bit sequence 151 at the first position 177 of the first instance 141 of the first bit sequence 151A-B comprises:

copying the first bit sequence 151 to become a second instance 142 of the first bit sequence 151 at a first destination 157; and repeatedly copying the first bit sequence 151 again and again to become a plurality of additional instances 143 of the first bit sequence 151.

57. The method of any one of the above Clauses wherein instantiating the first bit sequence 151 the first position 177 of the first instance 141 of the first bit sequence 151A-B comprises:

copying the first bit sequence 151 to become a second instance 142 of the first bit sequence 151 at a first destination 157; and repeatedly copying the first bit sequence 151 again to become one or more additional instances 143 of the first bit sequence 151 at other destinations 157.

58. The method of any one of the above Clauses comprising:

copying the first bit sequence 151 from a position 177 of the second instance 141 of the first bit sequence 151A-B to become a third instance 143 of the first bit sequence 151 at a second destination 157 after the particular position 177 of the first instance 141 of the first bit sequence 151A-B has been repurposed; and thereafter repurposing the position 177 of the second instance 141 of the first bit sequence 151A-B.

59. The method of any one of the above Clauses comprising:

obtaining a paused first thread 301 by pausing a first active thread executing (code 175 somewhere in) the first bit sequence 151 and to obtain a paused second thread 302 by pausing a second active thread executing (code 175 somewhere in) the second bit sequence 152 and thereafter to allow the first paused thread 301 to resume and execute an entirety thereof (e.g. by executing one or more utility threads 303) while the second thread 302 remains paused;

modifying the paused second thread 302 (e.g. by executing one or more utility threads 303) so that the second thread 302 refers to another instance 143 of the second bit sequence 152 at a particular destination 157 thereof (1) after instantiating the second bit sequence 152 at the particular destination 157B, 157E thereof and (2) after repurposing a particular (vacated or other) first position 177A of the first instance 141 of the second bit sequence 152 both; and (triggering or otherwise) allowing the execution of the paused second thread 302 to resume.

60. The method of any one of the above Clauses comprising:

obtaining a paused first thread 301 by pausing a first active thread executing (code 175 somewhere in) the first bit sequence 151;

obtaining a paused second thread 302 by pausing a second active thread executing (code 175 somewhere in) the second bit sequence 152;

allowing the paused first thread 301 to resume and execute an entirety thereof (e.g. by executing one or more utility threads 303) while the second thread 302 remains paused;

modifying the paused second thread 302 (e.g. by executing one or more utility threads 303) so that the second thread 302 refers to another instance 143 of the second bit sequence 152 at a particular destination 157 thereof (1) after instantiating the second bit sequence 152 at the particular destination 157B, 157E thereof and (2) after repurposing a particular (vacated or other) first position 177A of the first instance 141 of the second bit sequence 152 both; and (triggering or otherwise) allowing the execution of the paused second thread 302 to resume.

61. The method of any one of the above Clauses comprising:

copying the first bit sequence 151 from a position 177 of the second instance 141 of the first bit sequence 151A-B to become a third instance 143 of the first bit sequence 151 at a second destination 157 after the particular position 177 of the first instance 141 of the first bit sequence 151A-B has been repurposed; and automatically repurposing the position 177 of the second instance 141 of the first bit sequence 151A-B thereafter.

62. The method of any one of the above Clauses comprising:

repurposing the particular position 177 of the first instance 141 of the first bit sequence 151A-B.

63. The method of any one of the above Clauses wherein (at least one instance of) repurposing the particular position 177 of the first instance 141 of the first bit sequence 151A-B (is included and) comprises:

modifying at least some content 176, 1176 in the particular position 177 of the first instance 141 of the first bit sequence 151A-B as a component of repurposing the particular position 177 of the first instance 141 of the first bit sequence 151A-B.

64. The method of any one of the above Clauses wherein (at least one instance of) repurposing the particular position 177 of the first instance 141 of the first bit sequence 151A-B (is included and) comprises:

repurposing at least some content 176, 1176 of (one or more instances 141, 142 of) the first bit sequence 151A-B as a component of repurposing the particular position 177 of the first instance 141 of the first bit sequence 151A-B.

65. The method of any one of the above Clauses wherein (at least one instance of) repurposing the particular position 177 of the first instance 141 of the first bit sequence 151A-B comprises:

decommissioning at least some of the particular position 177 of the first instance 141 of the first bit sequence 151A-B as a component of repurposing the particular position 177 of the first instance 141 of the first bit sequence 151A-B.

66. The method of any one of the above Clauses wherein (at least one instance of) repurposing the particular position 177 of the first instance 141 of the first bit sequence 151A-B comprises:

unmapping the particular position 177 of the first instance 141 of the first bit sequence 151A-B as a component of repurposing the particular position 177 of the first instance 141 of the first bit sequence 151A-B.

67. The method of any one of the above Clauses wherein (at least one instance of) repurposing the particular position 177 of the first instance 141 of the first bit sequence 151A-B comprises:

rendering at least some content 176, 1176 inaccessible for reading within the particular position 177 of the first instance 141 of the first bit sequence 151A-B as a component of repurposing the particular position 177 of the first instance 141 of the first bit sequence 151A-B.

68. The method of any one of the above Clauses wherein (at least one instance of) repurposing the particular position 177 of the first instance 141 of the first bit sequence 151A-B comprises:

disabling at least some instructions 237 within the particular position 177 of the first instance 141 of the first bit sequence 151A-B as a component of repurposing the particular position 177 of the first instance 141 of the first bit sequence 151A-B.

69. The method of any one of the above Clauses wherein (at least one instance of) repurposing the particular position 177 of the first instance 141 of the first bit sequence 151A-B comprises:

hijacking at least some content 176, 1176 in the particular position 177 of the first instance 141 of the first bit sequence 151A-B as a component of repurposing the particular position 177 of the first instance 141 of the first bit sequence 151A-B.

70. The method of any one of the above Clauses wherein (at least one instance of) repurposing the particular position 177 of the first instance 141 of the first bit sequence 151A-B comprises:

installing one or more traps 381 in the particular position 177 of the first instance 141 of the first bit sequence 151A-B as a component of repurposing the particular position 177 of the first instance 141 of the first bit sequence 151A-B.

71. The method of any one of the above Clauses wherein (at least one instance of) repurposing the particular position 177 of the first instance 141 of the first bit sequence 151A-B comprises:

deleting at least some instructions 237 within the particular position 177 of the first instance 141 of the first bit sequence 151A-B as a component of repurposing the particular position 177 of the first instance 141 of the first bit sequence 151A-B.

72. The method of any one of the above Clauses wherein (at least one instance of) repurposing the particular position 177 of the first instance 141 of the first bit sequence 151A-B comprises:

deleting at least some content 176, 1176 in the particular position 177 of the first instance 141 of the first bit sequence 151A-B as a component of repurposing the particular position 177 of the first instance 141 of the first bit sequence 151A-B.

73. The method of any one of the above Clauses wherein (at least one instance of) repurposing the particular position 177 of the first instance 141 of the first bit sequence 151A-B comprises:

deleting at least some content 176, 1176 in the particular position 177 of the first instance 141 of the first bit sequence 151A-B as a component of repurposing the particular position 177 of the first instance 141 of the first bit sequence 151A-B.

74. The method of any one of the above Clauses wherein (at least one instance of) the invoking transistor-based circuitry configured to repurpose the particular position 177 of the first instance 141 of the first bit sequence 151 occurs only after (at least one instance of) the first bit sequence 151 arrives at the first destination 157.

75. The method of any one of the above Clauses wherein (at least one instance of) the invoking transistor-based circuitry configured to repurpose the particular position 177 of the first instance 141 of the first bit sequence 151A occurs (at least once) only after the transistor-based circuitry configured to instantiate the first bit sequence 151 at the first destination 157 is invoked.

76. The method of any one of the above Clauses comprising:

obtaining at least a paused first thread 301, 302 by pausing (at least) a first active thread 301, 302 executing (code 175 somewhere in) the first digital object while the first bit sequence 151A is instantiated at the first destination 157.

77. The method of any one of the above Clauses comprising:

obtaining at least a paused first thread 301, 302 by pausing (at least) a first active thread executing (code 175 somewhere in) the first digital object while the repurposing occurs.

78. The method of any one of the above Clauses wherein the Boolean determination 335 that the first and second bit sequences 151, 152 are separable is new (i.e. less than 24 hours old and not previously established) when the first bit sequence 151A is instantiated at the first destination 157.

79. The method of any one of the above Clauses wherein the Boolean determination 335 that the first and second bit sequences 151, 152 are separable is new (i.e. less than 24 hours old and not previously established) when the repurposing occurs.

80. A security enhancement system 600, 700, 800, 900 as indicated in any one of the above method Clauses.

81. A security enhancement system 600, 700, 800, 900 pertaining to first and second bit sequences 151, 152 both within a first (file, function 121, or other) digital object wherein the system comprises:

transistor-based circuitry (e.g. protocol invocation, recognition, and response modules 651, 655, 658 jointly) configured to obtain a (so-called) first determination 335 that a first instance 141 of the first bit sequence 151A, 151B and a first instance 141 of the second bit sequence 152 are separable; and transistor-based circuitry (e.g. an API interface or other invocation module 651) configured to cause a reconfiguration/repurposing of a position 177A of the first instance 141 of the second bit sequence 152.

82. The system of any one of the above Clauses wherein the first determination affirmatively indicates that the first instance 141 of the first bit sequence 151A, 151B and the first instance 141 of the second bit sequence 152 are separable notwithstanding that (at least part of) a position 177 of the first instance 141 of the first bit sequence 151 is "near" a position 177A of the first instance 141 of the second bit sequence 152 (i.e. adjacent or otherwise having an offset 168 of less than 1 megabyte).

With respect to the numbered claims expressed below, those skilled in the art will appreciate that recited operations therein may generally be performed in any order. Also, although various operational flows are presented in sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other such transitive, relational, or other connections do not generally exclude such variants, unless context dictates otherwise.

What is claimed is:

1. A security enhancement method pertaining to first and second bit sequences both within a first function wherein said method comprises:
    invoking transistor-based circuitry configured to parse one or more machine code instruction sequences resident in said first bit sequence;
    invoking transistor-based circuitry configured to obtain a determination that said first and second bit sequences are suitable for separation;
    invoking transistor-based circuitry configured to obtain a new first determination that a first instance of said first bit sequence and a first instance of said second bit sequence are separable after and in response to an application of one or more separability-indicative criteria to said first and second bit sequences pursuant to a moving target defense;
    automatically invoking transistor-based circuitry configured to cause content at a position of said first instance of said second bit sequence to be changed after said second bit sequence is instantiated at a first destination as a conditional response to said first determination that said first instance of said first bit sequence and said first instance of said second bit sequence are separable wherein said content at said position is changed less than 7 days after a determination that said first function is ready for subdivision and also less than 7 days after said first determination that said first instance of said first bit sequence and said first instance of said second bit sequence are separable; and
    automatically invoking transistor-based circuitry configured to preserve correctness of said first bit sequence to said second bit sequence at least by modifying a first feature of an entry point into said second bit sequence that resides in said first bit sequence to refer to a second instance of said second bit sequence at said first destination.

2. The method of claim 1 wherein said invoking said transistor-based circuitry configured to preserve correctness of said first bit sequence to said second bit sequence at least by modifying said first feature of said entry point into said second bit sequence that resides in said first bit sequence to refer to said second instance of said second bit sequence at said first destination occurs after said second bit sequence arrives at said first destination thereof.

3. The method of claim 1 comprising:
    parsing one or more machine code instruction sequences resident in said second bit sequence; and
    preserving correctness of said second bit sequence to said first bit sequence (at least) by modifying a first feature of an entry point into said first bit sequence that resides in said second bit sequence to refer to a second instance of said first bit sequence instead.

4. The method of claim 1 comprising:
    invoking transistor-based circuitry configured to obtain a paused first thread by pausing a first active thread executing said first bit sequence and concurrently to obtain a paused second thread by pausing a second active thread executing said second bit sequence and thereafter to allow said first paused thread to resume and execute completely while said second thread remains paused.

5. The method of claim 1 comprising:
    updating a first entry point into said first instance of said first bit sequence to access a corresponding first entry point into said second instance of said first bit sequence.

6. A security enhancement method pertaining to first and second bit sequences both within a first function wherein said method comprises:
    invoking transistor-based circuitry configured to obtain a first determination that a first instance of said first bit sequence and a first instance of said second bit sequence are separable after an application of one or more separability-indicative criteria to said first and second bit sequences whereby one or more machine code instruction sequences resident in said first bit sequence are parsed and whereby one or more machine code instruction sequences resident in said second bit sequence are parsed; and
    invoking transistor-based circuitry configured to cause content at a position of said first instance of said second bit sequence to be changed after said second bit sequence is instantiated at a first destination as a conditional response to said first determination that said first instance of said first bit sequence and said first instance of said second bit sequence are separable wherein correctness is preserved at least by modifying a first feature of an entry point into said second bit sequence that resides in said first bit sequence to refer to a second instance of said second bit sequence at a first destination of said second bit sequence and wherein correctness is preserved at least by modifying a first feature of an entry point into said first bit sequence that resides in said second bit sequence to refer to a second instance of said first bit sequence.

7. The method of claim 6 wherein said content at said position is changed less than 7 days after a determination that said first function is ready for subdivision and also less than 7 days after said first determination that said first instance of said first bit sequence and said first instance of said second bit sequence are separable.

8. The method of claim 6 comprising:
invoking transistor-based circuitry configured to repurpose a position of said first instance of said first bit sequence after said first bit sequence is instantiated at a first destination thereof that is farther from a position of said first instance of said second bit sequence than said position of said first instance of said first bit sequence.

9. The method of claim 6 comprising:
parsing one or more machine code instruction sequences resident in said first and second bit sequences;
obtaining a determination that said first function is ready for subdivision by applying one or more readiness-indicative criteria to one or more threads in an environment that includes said first function;
preserving correctness of said first bit sequence to said second bit sequence at least by modifying a first feature of an entry point into said second bit sequence that resides in said first bit sequence to refer to a second instance of said second bit sequence at said first destination; and
repeatedly copying said first bit sequence so as to become a succession of several additional instances of said first bit sequence without a corresponding several additional instances of said second bit sequence.

10. The method of claim 6 comprising:
obtaining said first determination that said first and second bit sequences are separable by applying one or more separability-indicative criteria that include detecting that unconditionally terminal code that will block any potential downstream progression therefrom is positioned downstream from an entry point of a more-upstream code sequence and before an entry point of a more-downstream code sequence so as to avoid a risk of creating a Return-Oriented-Programming (ROP) gadget, wherein said more-upstream code sequence is either said first bit sequence or said second bit sequence and wherein said more-downstream code sequence is either said second bit sequence or said first bit sequence.

11. The method of claim 6 comprising:
automatically invoking transistor-based circuitry configured to repurpose a position of said first instance of said first bit sequence after said first bit sequence is instantiated at a first destination thereof also as a conditional response to said first determination that said first instance of said first bit sequence and said first instance of said second bit sequence are separable.

12. The method of claim 6 wherein said first determination that a first instance of said first bit sequence and a first instance of said second bit sequence are separable is used within 24 hours after a parsing of one or more machine code instruction sequences resident in said first bit sequence that identifies a set of one or more entry points therefrom into said first instance of said second bit sequence and wherein said modifying said first feature of said entry point into said second bit sequence that resides in said first bit sequence to refer to said second instance of said second bit sequence at said first destination occurs after transistor-based circuitry configured to instantiate said second bit sequence at said first destination thereof is invoked, and wherein said one or more entry points includes said first feature of said entry point into said second bit sequence.

13. The method of claim 6 comprising:
obtaining a paused first thread by pausing a first active thread executing said first bit sequence;
obtaining a paused second thread by pausing a second active thread executing said second bit sequence;
allowing said paused first thread to resume and execute an entirety thereof while said second thread remains paused;
modifying said paused second thread so that said second thread refers to another instance of said second bit sequence at a particular destination thereof (1) after instantiating said second bit sequence at said particular destination thereof and (2) after repurposing a first position of said first instance of said second bit sequence both; and
thereafter allowing said execution of said paused second thread to resume.

14. The method of claim 6 comprising:
parsing said one or more machine code instruction sequences resident in said first bit sequence;
parsing said one or more machine code instruction sequences resident in said second bit sequence;
preserving correctness of said first bit sequence to said second bit sequence at least by modifying a first feature of an entry point into said second bit sequence that resides in said first bit sequence to refer to a second instance of said second bit sequence at a first destination of said second bit sequence; and
preserving correctness of said second bit sequence to said first bit sequence by modifying a first feature of an entry point into said first bit sequence that resides in said second bit sequence to refer to a second instance of said first bit sequence.

15. The method of claim 6 wherein said invoking said transistor-based circuitry configured to obtain said first determination that said first instance of said first bit sequence and said first instance of said second bit sequence are separable comprises:
obtaining said determination that said first and second bit sequences are separable by applying one or more separability-indicative criteria that include detecting that a more-upstream sequence is unconditionally terminal so as to block any potential downstream progression therefrom toward a more-downstream sequence as a component of said first determination that said first instance of said first bit sequence and said first instance of said second bit sequence are separable.

16. The method of claim 6 wherein said invoking said transistor-based circuitry configured to obtain said first determination that said first instance of said first bit sequence and said first instance of said second bit sequence are separable comprises:
obtaining a determination that said first function is ready for subdivision by applying one or more readiness-indicative criteria to one or more threads in an environment that includes said first function as a component of said first determination that said first instance of said first bit sequence and said first instance of said second bit sequence are separable.

17. The method of claim 6 comprising:
parsing said one or more machine code instruction sequences resident in said second bit sequence; and
preserving correctness of said second bit sequence to said first bit sequence by modifying said first feature of said entry point into said first bit sequence that resides in said second bit sequence to refer to said second instance of said first bit sequence instead.

18. A security enhancement computer program product comprising:
one or more tangible, non-transitory storage media; and
machine instructions borne on said one or more tangible, non-transitory storage media which, when running on one or more computer systems, cause said one or more computer systems to perform a method that comprises:
invoking transistor-based circuitry configured to obtain a first determination that a first instance of said first bit sequence and a first instance of said second bit sequence are separable after an application of one or more separability-indicative criteria to said first and second bit sequences whereby one or more machine code instruction sequences resident in said first bit sequence are parsed and whereby one or more machine code instruction sequences resident in said second bit sequence are parsed; and
invoking transistor-based circuitry configured to cause content at a position of said first instance of said second bit sequence to be changed after said second bit sequence is instantiated at a first destination as a conditional response to said first determination that said first instance of said first bit sequence and said first instance of said second bit sequence are separable wherein correctness is preserved at least by modifying a first feature of an entry point into said second bit sequence that resides in said first bit sequence to refer to a second instance of said second bit sequence at a first destination of said second bit sequence and wherein correctness is preserved at least by modifying a first feature of an entry point into said first bit sequence that resides in said second bit sequence to refer to a second instance of said first bit sequence.

19. A security enhancement system pertaining to first and second bit sequences both within a first function wherein said system comprises:
transistor-based circuitry configured to obtain a first determination that a first instance of said first bit sequence and a first instance of said second bit sequence are separable after an application of one or more separability-indicative criteria to said first and second bit sequences whereby one or more machine code instruction sequences resident in said first bit sequence are parsed and whereby one or more machine code instruction sequences resident in said second bit sequence are parsed; and
transistor-based circuitry configured to cause content at a position of said first instance of said second bit sequence to be changed after said second bit sequence is instantiated at a first destination as a conditional response to said first determination that said first instance of said first bit sequence and said first instance of said second bit sequence are separable wherein correctness is preserved at least by modifying a first feature of an entry point into said second bit sequence that resides in said first bit sequence to refer to a second instance of said second bit sequence at a first destination of said second bit sequence and wherein correctness is preserved at least by modifying a first feature of an entry point into said first bit sequence that resides in said second bit sequence to refer to a second instance of said first bit sequence.

20. The system of claim 19 wherein said first determination affirmatively indicates that said first instance of said first bit sequence and said first instance of said second bit sequence are separable.

* * * * *